(12) United States Patent
Lee et al.

(10) Patent No.: US 12,125,787 B2
(45) Date of Patent: Oct. 22, 2024

(54) STANDARD CELL AND AN INTEGRATED CIRCUIT INCLUDING THE SAME

(71) Applicant: SAMSUNG ELECTRONICS CO., LTD., Suwon-si (KR)

(72) Inventors: Jae-Boong Lee, Yongin-si (KR); Jung-Ho Do, Hwaseong-si (KR); Tae-Joong Song, Seongnam-si (KR); Seung-Young Lee, Seoul (KR); Jong-Hoon Jung, Seongnam-si (KR); Ji-Su Yu, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1029 days.

(21) Appl. No.: 17/037,569

(22) Filed: Sep. 29, 2020

(65) Prior Publication Data
US 2021/0013149 A1    Jan. 14, 2021

Related U.S. Application Data

(63) Continuation of application No. 15/946,075, filed on Apr. 5, 2018, now Pat. No. 10,811,357.

(30) Foreign Application Priority Data

Apr. 11, 2017  (KR) ......................... 10-2017-0046929
Sep. 6, 2017   (KR) ......................... 10-2017-0113950

(51) Int. Cl.
*H01L 23/528*       (2006.01)
*G06F 30/327*       (2020.01)
(Continued)

(52) U.S. Cl.
CPC ........ *H01L 23/5286* (2013.01); *G06F 30/327* (2020.01); *G06F 30/392* (2020.01);
(Continued)

(58) Field of Classification Search
CPC .... G06F 30/327; G06F 30/394; G06F 30/392; G06F 30/396; G06F 30/3947;
(Continued)

(56) References Cited

U.S. PATENT DOCUMENTS 5,933,725 A    8/1999 Kirsch et al.
6,598,206 B2   7/2003 Darden et al.
(Continued)

FOREIGN PATENT DOCUMENTS

CN    105608243    5/2016
JP    2004-158532  6/2004
(Continued)

OTHER PUBLICATIONS

Office Action issued in corresponding CN Patent Application No. 201810319727.4 on Oct. 13, 2023.

*Primary Examiner* — Phat X Cao
*Assistant Examiner* — Diana C Vieira
(74) *Attorney, Agent, or Firm* — F. CHAU & ASSOCIATES, LLC

(57) ABSTRACT

An integrated circuit including: a power rail including first and second conductive lines spaced apart from each other in a vertical direction, wherein the first and second conductive lines extend in parallel to each other in a first horizontal direction, and are electrically connected to each other, to supply power to a first standard cell, wherein the first and second conductive lines are disposed at a boundary of the first standard cell; and a third conductive line between the first and second conductive lines and extending in a second horizontal direction orthogonal to the first horizontal direction, to transfer an input signal or an output signal of the first standard cell.

18 Claims, 17 Drawing Sheets

(51) Int. Cl.
*G06F 30/392* (2020.01)
*G06F 30/394* (2020.01)
*H01L 21/8234* (2006.01)
*H01L 23/522* (2006.01)
*H01L 27/02* (2006.01)
*H01L 27/088* (2006.01)
*H01L 27/092* (2006.01)
*H01L 27/118* (2006.01)
*G06F 115/02* (2020.01)

(52) U.S. Cl.
CPC .... *G06F 30/394* (2020.01); *H01L 21/823475* (2013.01); *H01L 23/5226* (2013.01); *H01L 23/5283* (2013.01); *H01L 27/0207* (2013.01); *H01L 27/11807* (2013.01); *G06F 2115/02* (2020.01); *H01L 27/088* (2013.01); *H01L 27/092* (2013.01); *H01L 2027/11881* (2013.01)

(58) Field of Classification Search
CPC ............ G06F 30/3953; H01L 23/5286; H01L 2027/11881; H01L 23/5226; H01L 21/823475; H01L 23/5283; H01L 27/0207; H01L 27/11807; H01L 27/088; H01L 27/092

See application file for complete search history.

(56) References Cited

U.S. PATENT DOCUMENTS

| | | | |
|---|---|---|---|
| 7,076,756 B2 | 7/2006 | Ichimiya | |
| 7,800,409 B2 | 9/2010 | Pitts | |
| 8,051,401 B2 | 11/2011 | Frederick | |
| 8,507,957 B2 | 8/2013 | Hou et al. | |
| 8,598,633 B2 | 12/2013 | Tarabbia et al. | |
| 8,946,914 B2 | 2/2015 | Stephens et al. | |
| 9,070,552 B1 | 6/2015 | Shah et al. | |
| 9,558,312 B2 | 1/2017 | Lu et al. | |
| 9,653,393 B2 | 5/2017 | Chen et al. | |
| 9,653,413 B2 | 5/2017 | Frederick, Jr. et al. | |
| 9,734,276 B2 | 8/2017 | Kim et al. | |
| 10,283,526 B2 * | 5/2019 | Zhu ..................... | H01L 23/5286 |
| 2008/0023792 A1 | 1/2008 | Liu et al. | |
| 2009/0166883 A1 | 7/2009 | Nishimura | |
| 2009/0321791 A1 | 12/2009 | Wagner et al. | |
| 2012/0025273 A1 | 2/2012 | Lu et al. | |
| 2013/0063203 A1 | 3/2013 | Utsumi et al. | |
| 2013/0154128 A1 | 6/2013 | Wang et al. | |
| 2014/0252650 A1 | 9/2014 | Utsumi | |
| 2014/0264924 A1 | 9/2014 | Yu et al. | |
| 2015/0067616 A1 | 3/2015 | Hsu et al. | |
| 2015/0214154 A1 | 7/2015 | Nakayama | |
| 2016/0300839 A1 | 10/2016 | Kim et al. | |
| 2016/0358856 A1 | 12/2016 | Kim | |
| 2017/0018504 A1 | 1/2017 | Byun | |
| 2017/0301667 A1 | 10/2017 | Or-Bach et al. | |
| 2018/0114755 A1 | 4/2018 | Kirimura | |
| 2018/0151496 A1 | 5/2018 | Biswas et al. | |
| 2018/0294226 A1 | 10/2018 | Lee et al. | |
| 2019/0148284 A1 | 5/2019 | Aipperspach | |

FOREIGN PATENT DOCUMENTS

| | | |
|---|---|---|
| KR | 10-2012-0127252 | 11/2012 |
| KR | 10-2015-0068910 | 6/2015 |
| KR | 10-2016-0023542 | 3/2016 |
| TW | 200807685 | 2/2008 |
| TW | 201618268 | 5/2016 |

\* cited by examiner

STANDARD CELL AND AN INTEGRATED CIRCUIT INCLUDING THE SAME

CROSS-REFERENCE TO RELATED APPLICATIONS

This application is a continuation of U.S. patent application Ser. No. 15/946,075 filed on Apr. 5, 2018, which claims priority under 35 U.S.C. § 119 to Korean Patent Application Nos. 10-2017-0046929, filed on Apr. 11, 2017 and 10-2017-0113950, filed on Sep. 6, 2017, in the Korean Intellectual Property Office, the disclosures of which are incorporated by reference herein in their entireties.

TECHNICAL FIELD

The inventive concept relates to an integrated circuit, and more particularly, to an integrated circuit including a standard cell and a method of fabricating the integrated circuit.

DISCUSSION OF RELATED ART

As a semiconductor process is miniaturized, a pattern included in an integrated circuit may have a reduced width and/or thickness. This reduced width and/or thickness may increase a chance of a voltage drop (or an IR drop) on the pattern. The IR drop may result in a signal being attenuated when passing through the pattern. As a consequence, the transition of the signal may be delayed, and the performance of the integrated circuit may deteriorate.

SUMMARY

According to an exemplary embodiment of the inventive concept, there is provided an integrated circuit including: a power rail including first and second conductive lines spaced apart from each other in a vertical direction, wherein the first and second conductive lines extend in parallel to each other in a first horizontal direction, and are electrically connected to each other, to supply power to a first standard cell, wherein the first and second conductive lines are disposed at a boundary of the first standard cell; and a third conductive line between the first and second conductive lines and extending in a second horizontal direction orthogonal to the first horizontal direction, to transfer an input signal or an output signal of the first standard cell.

According to an exemplary embodiment of the inventive concept, there is provided an integrated circuit including first and second standard cells arranged in a first horizontal direction; a power rail including first and second conductive lines spaced apart from each other in a vertical direction, wherein the first and second conductive lines extend in parallel in the first horizontal direction, and are electrically connected to each other, to supply power to the first and second standard cells, wherein the first and second conductive lines are disposed at a boundary of each of the first and second standard cells; and a third conductive line between the first and second conductive lines and extended in a second horizontal direction orthogonal to the first horizontal direction, to transfer an input signal or an output signal of the first standard cell, wherein the power rail further includes a fourth conductive line extending in the first horizontal direction on the boundary of the second standard cell, wherein the fourth conductive line is electrically connected to the first and second conductive lines, and is formed in a same layer as the third conductive line.

According to an exemplary embodiment of the inventive concept, there is provided an integrated circuit including a power rail including a plurality of conductive lines on a boundary of a plurality of standard cells, wherein the plurality of conductive lines are formed in a plurality of conductive layers and extend in parallel to each other in a first horizontal direction, to supply power to the plurality of standard cells; and a signal line passing the power rail in a second horizontal direction orthogonal to the first horizontal direction, wherein the signal line is formed in one of the plurality of conductive layers, to transfer an input signal or an output signal of at least one of the plurality of standard cells, wherein the power rail comprises a first conductive line formed in the conductive layer in which the signal line is formed, wherein first conductive line extends in the first horizontal direction and is insulated from the signal line.

DETAILED DESCRIPTION OF THE EMBODIMENTS

Figure 1:
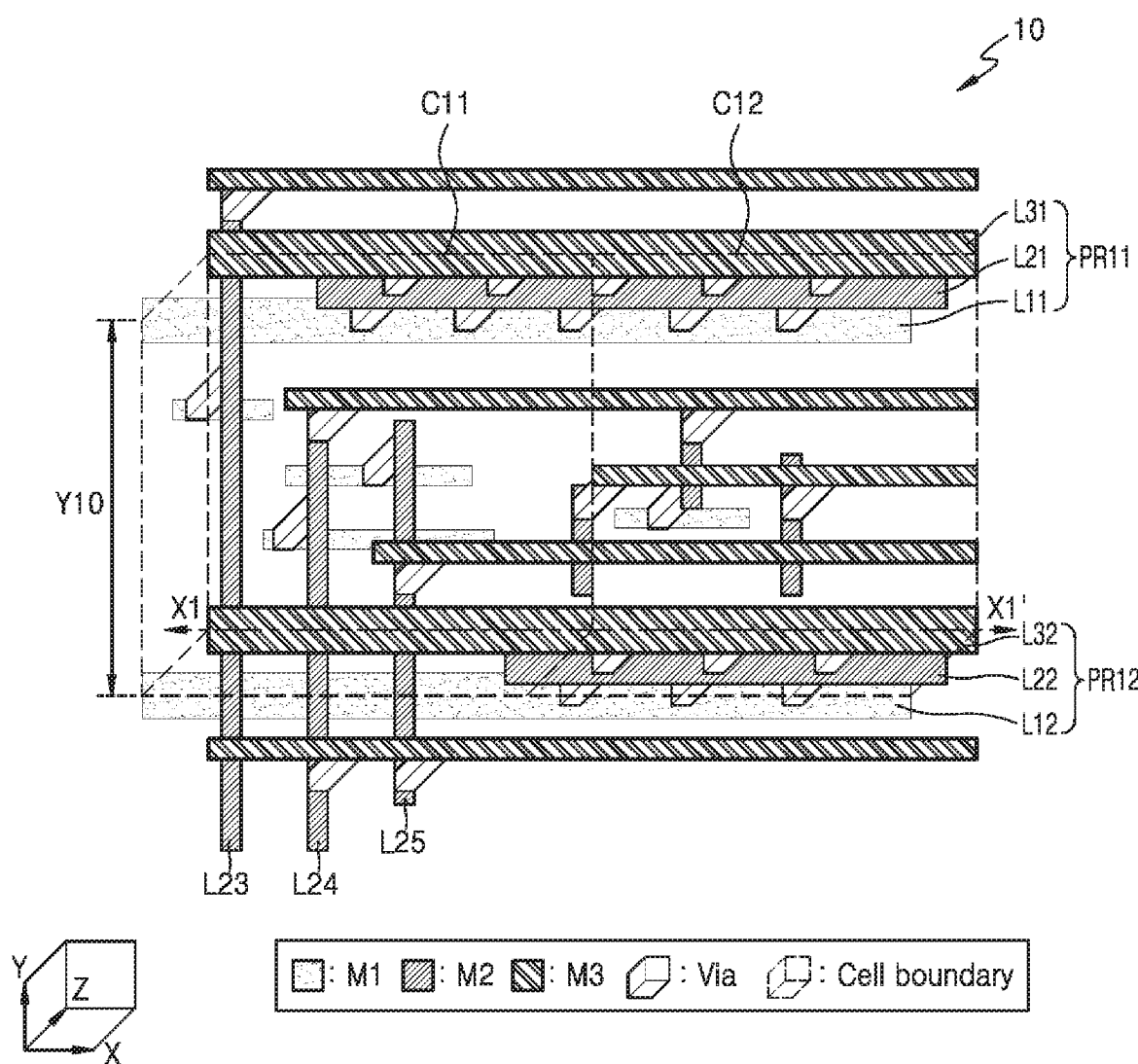
FIG. 1 is a circuit diagram of a part of an integrated circuit according to an exemplary embodiment of the inventive concept.
Figure 2A:
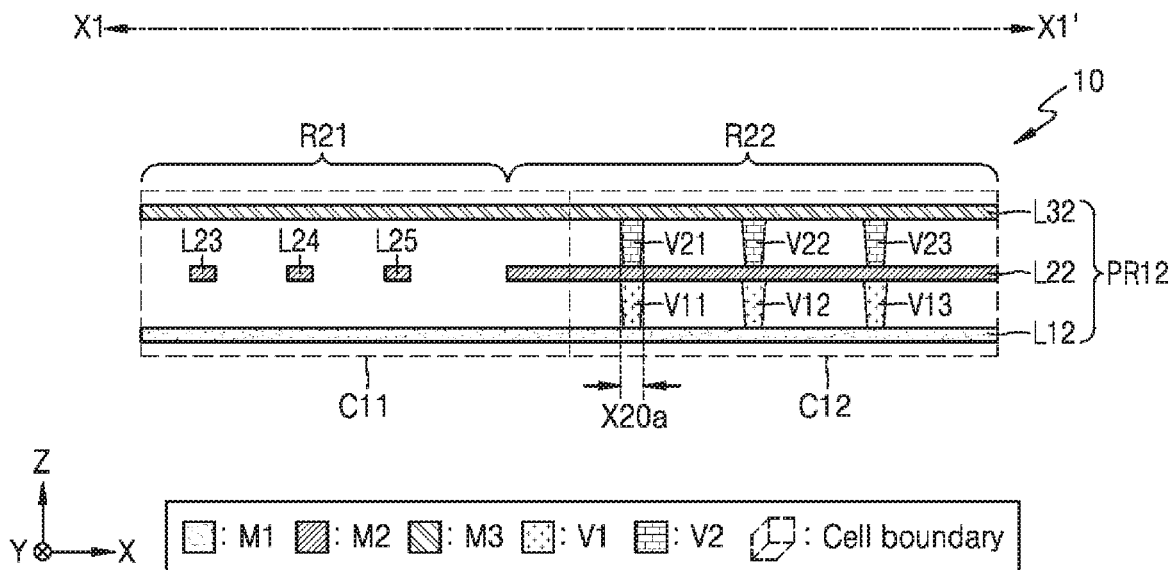
FIGS. 2A and 2B are cross-sectional views of the integrated circuit cut in parallel to a Z-axis direction along a line X1-X1' of FIG. 1, according to exemplary embodiments of the inventive concept.
Figure 2B:
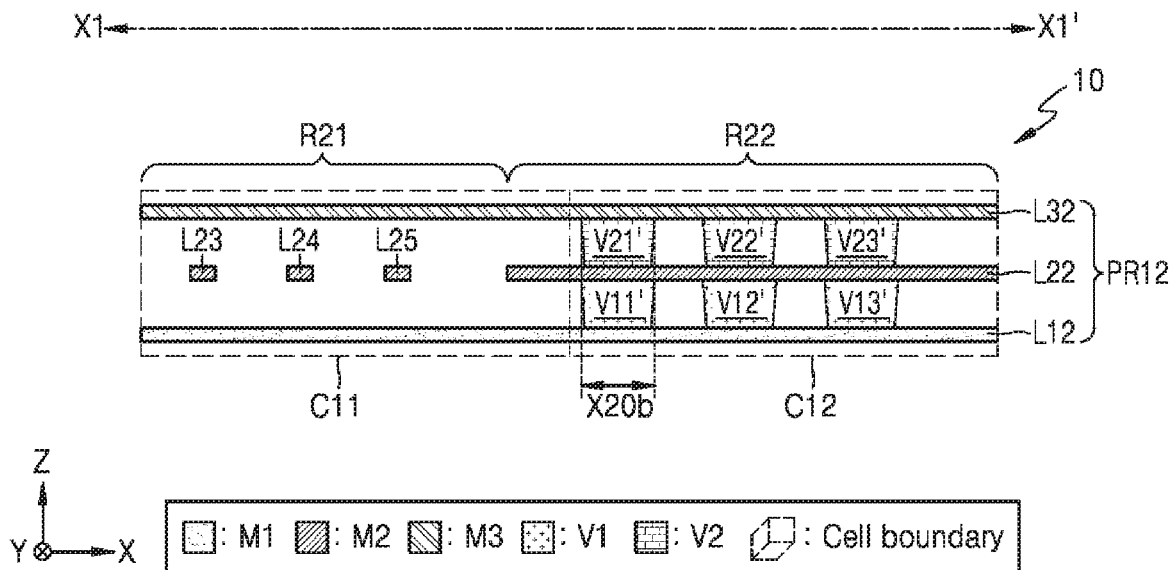

FIG. 1 is a diagram of a part of an integrated circuit 10 according to an exemplary embodiment of the inventive concept. FIGS. 2A and 2B are cross-sectional views of the integrated circuit 10 cut in parallel to a Z-axis direction along a line X1-X1' of FIG. 1, according to exemplary embodiments of the inventive concept. For convenience of illustration, FIGS. 1, 2A, and 2B illustrate only some layers included in the integrated circuit 10. For example, FIGS. 1, 2A and 2B illustrate some of the layers formed by a back end of line (BEOL) process. Hereinafter, a plane formed of X- and Y-axes may be referred to as a horizontal plane; elements placed in a Z direction may be construed as being below or above other elements in the Z direction, for example.

Referring to FIGS. 1, 2A, and 2B, the integrated circuit 10 may include standard cells C11 and C12 as shown by dashed lines. A standard cell is a unit of a layout included in the integrated circuit 10. The integrated circuit 10 may include a plurality of various standard cells. Standard cells may have a structure conforming to a predetermined specification. For example, as shown in FIG. 1, the standard cells C11 and C12 may have a certain height, in other words, a length Y10 in a Y-axis direction, and may have a boundary overlapping a pair of power rails PR11 and PR12 that are spaced apart from each other in the Y-axis direction and extend in parallel in an X-axis direction. Although the standard cells C11 and C12 include patterns of M1 to M3 layers, the standard cells C11 and C12 may include patterns of just the M1 layer or patterns of just the M1 and M2 layers. For example, structures of the standard cells C11 and C12 defined by a standard cell library may be defined from a substrate to the M1 layer or the M2 layer, and some patterns of the M2 layer and the pattern of the M3 layer may be determined in a routing operation after the standard cells C11 and C12 are placed in a design process of the standard cells C1 and C12.

The standard cells C11 and C12 may include patterns along which signals move. For example, the first standard cell C11 may include a pattern in which an internal signal generated in the first standard cell C11 moves, and may include patterns in which an input signal and an output signal of the first standard cell C11 respectively move, e.g., an input pin and an output pin. In the integrated circuit 10 of FIG. 1, the input pin and the output pin of the first standard cell C11 may be patterns formed on the M2 layer. The input pin and the output pin of the first standard cell C11 may be electrically connected to the outside of the first standard cell C11. For example, the input pin of the first standard cell C11 may be electrically connected to an output pin of another standard cell, and the output pin of the first standard cell C11 may be electrically connected to an input pin of another standard cell. To electrically connect the input pin and/or the output pin of the first standard cell C11 to the outside of the first standard cell C11, patterns passing through a boundary of the first standard cell C11 may be used. For example, as shown in FIG. 1, patterns of the M3 layer, which are connected to the input pin and/or the output pin of the first standard cell C11 formed on the M2 layer through vias, may pass through the boundary of the first standard cell C11 in the X-axis direction. In addition, as shown in FIG. 1, the input pin and/or the output pin of the first standard cell C11 formed on the M2 layer may extend such that the patterns of the M2 layer may pass through the first standard cell C11 in the Y-axis direction. As will be described later, an operation of connecting the input pins and the output pins of the standard cells C11 and C12 (e.g., a task of generating patterns or signal routing) may be influenced by the power rails PR11 and PR12 having structures for mitigating an IR drop.

The power rails PR11 and PR12 for supplying power to the standard cells C11 and C12 may be arranged in the integrated circuit 10 at an interval equal to the height Y10 of the standard cells C11 and C12 and may extend in a direction perpendicular to the height Y10 of the standard cells C11 and C12, in other words, in the X-axis direction. In an exemplary embodiment of the inventive concept, a positive supply voltage (e.g., VDD) may be applied to the first power rail PR11 and a negative supply voltage (e.g., VSS) may be applied to the second power rail PR12. In an alternative embodiment, the negative supply voltage (e.g., VSS) may be applied to the first power rail PR11 and the positive supply voltage (e.g., VDD) may be applied to the second power rail PR12. In the following description, the positive supply voltage VDD is applied to the first power rail PR11 and the negative supply voltage VSS is applied to the second power rail PR12, but the inventive concept is not limited thereto. Elements formed in the standard cells C11 and C12, for example, transistors, may receive current from the first power rail PR11 and draw current into the second power rail PR12.

As a semiconductor process is miniaturized, widths and/or thicknesses (e.g., a length in the Z-direction) of patterns included in an integrated circuit may be reduced, and sizes of standard cells may also be reduced. Thus, the effect of a voltage drop (or an IR drop) on a pattern may increase. For example, the IR drop occurring in power rails connected to such standard cells may cause delays in signal transition, and thus, degrade the performance of an integrated circuit. In one method of mitigating the IR drop, the power rails PR11 and PR12 may have redundant patterns. For example, as shown in FIG. 1, the first power rail PR11 includes conductive lines L11 and L31 extending in parallel to each other in the X-axis direction and vias for electrically connecting the conductive lines L11 and L31 to each other. The second power rail PR12 may also include conductive lines L12 and L32 extending in parallel to each other in the X-axis direction and vias for electrically connecting the conductive lines L12 and L32 to each other. As shown in FIG. 1, the conductive lines L11 and L12 may be formed in the M1 layer, and the conductive lines L31 and L32 may be formed in the M3 layer.

As shown in FIG. 1, the power rails PR11 and PR12 may partially include the patterns of the M2 layer extending in the X-axis direction, in other words, conductive lines L21 and L22. Accordingly, in sections where the conductive lines L21 and L22 of the M2 layer are formed in the power rails PR11 and PR12, the IR drop may be further mitigated. In addition, a space where the patterns of the M2 layer are not formed in the power rails PR11 and PR12 may be used for signal routing. For example, as shown in FIG. 1, the input pin and/or the output pin of the first standard cell C11 may extend in the Y-axis direction such that conductive lines L23, L24, and L25 passing through the first power rail PR11 and/or the second power rail PR12 may be formed. In an exemplary embodiment of the inventive concept, widths (e.g., the length of the Y-axis direction) of the conductive lines L21 and L22 of the M2 layer included in the power rails PR11 and PR12 may be equal to or greater than widths (e.g., the length of the X-axis direction) of the conductive lines L23, L24, and L25 used for signal routing. Accordingly, the integrated circuit 10 may not only mitigate IR drop, but attain a degree of freedom as pertains to signal routing. Structures of the power rails PR11 and PR12 will be described in detail later with reference to FIGS. 2A and 2B which are cross-sectional views of the second power rail PR12. It is to be understood that the first power rail PR11 may also have the same or similar structure as that of the second power rail PR12.

Referring to FIG. 2A, in a region R22, the second power rail PR12 may include the conductive lines L12 and L32 extending in parallel to each other in the X-axis direction and formed in the M1 layer and the M3 layer, respectively, and the conductive line L22 formed in the M2 layer extending in the X-axis direction. The second power rail PR12 may also include a plurality of vias V11, V12, V13, V21, V22 and V23 for electrically interconnecting the conductive lines L12, L22 and L32 in the region R22. A region R21 where the pattern of the M2 layer is not formed in the second power rail PR12 may be a space for the conductive lines L23, L24 and L25. In other words, the input signal and/or the output signal of the first standard cell C11 may move through the conductive lines L23, L24 and L25 in the region R21. The conductive lines L23, L24 and L25 may pass through the second power rail PR12 in the Y axis direction. Thus, the region R21 of the second power rail PR12 may be used for signal routing whereas the region R22 of the second power rail PR12 may be used to mitigate an IR drop. For example, as described below with reference to FIG. 4, the region R21 of the second power rail PR12 may be used for a standard cell (e.g., C11) having a relatively large number of input and output pins, whereas the region R22 of the second power rail PR12 may be used for a standard cell (e.g., C12) in which an electrical characteristic of the output signal is important.

Referring to FIG. 2B, in an exemplary embodiment of the inventive concept, vias included in the region R22 of the second power rail PR12 may have a bar-like shape. For example, as shown in FIG. 2B, vias V11', V12', V13', V21', V22', and V23' for electrically interconnecting the conductive lines L12, L22 and L32 may have a bar shape extending in the X-axis direction, and may be referred to as bar type vias. In other words, a length X20b of the vias V11' and V21' in the X axis direction in FIG. 2B may be larger than a length X20a of the vias V11 and V21 in the X axis direction in FIG. 2A. Due to the bar shape of the vias V11' and V21', resistance values between the conductive lines L12, L22 and L32 of FIG. 2B may be reduced and the IR drop may be further mitigated. Although FIG. 2B illustrates an example in which all of the vias V11', V12', V13', V21', V22', and V23' of the second power rail PR12 have the bar shape, it is to be understood that just one or less than all of the vias may have the bar shape. Further, the vias included in the second power rail PR12, may have any shape, for example, the vias may have an oval cross-section on an XY-axis plane, such that the size of a plug filling the via can be increased to reduce a resistance of the via.

Figure 3A:
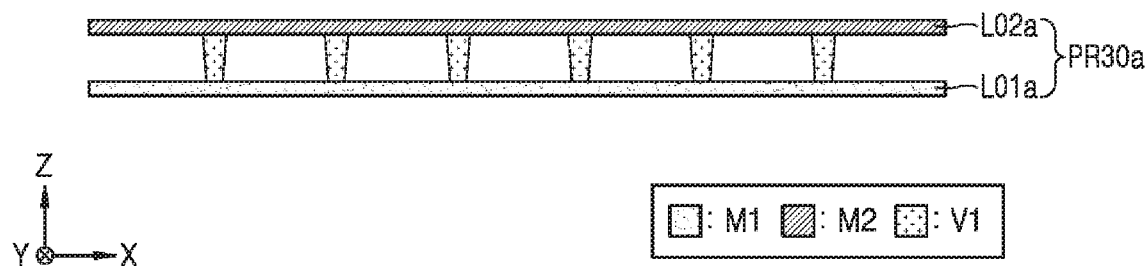
FIGS. 3A, 3B and 3C are diagrams of power rails according to comparative examples.
Figure 3B:
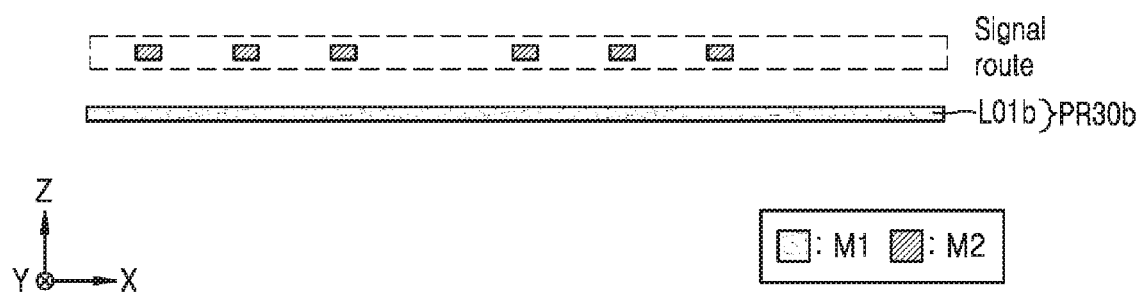
Figure 3C:
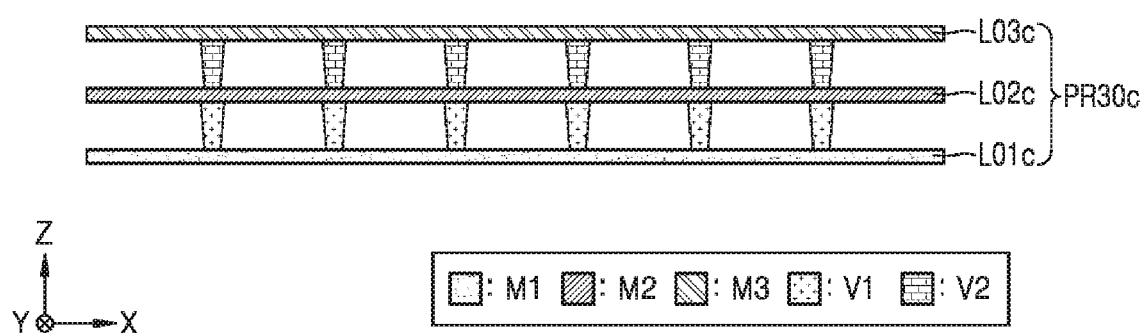

FIGS. 3A through 3C are diagrams of power rails PR30a, PR30b, and PR30c according to comparative examples. As described above with reference to FIGS. 1, 2A, and 2B, power rails according to exemplary embodiments of the inventive concept may include conductive lines formed in the M1 and M3 layers, and may partially include a conductive line formed in the M2 layer.

Referring to FIG. 3A, the power rail PR30a according to the comparative example may include conductive lines L01a and L02a which are respectively formed in the M1 layer and the M2 layer and extend in parallel with each other in an X axis direction. The power rail PR30a also includes vias for electrically interconnecting the conductive lines L01a and L02a to each other. Due to the presence of the conductive line L02a, to electrically connect an input pin and/or an output pin formed in the M2 layer of a standard cell adjacent to the power rail PR30a outside of the standard cell, the use of the M3 layer or another upper conductive layer may be required. Accordingly, signal routing congestion may occur. In some cases, due to a semiconductor process for fabricating an integrated circuit, a pattern formed on the M2 layer in the standard cell may only be formed in a direction parallel to a gate line (e.g., a Y-axis direction in FIG. 1). This limitation may increase signal routing congestion. Further, in some cases, due to the semiconductor process, the pattern formed on the M2 layer may have a width (e.g., a length in the Y-axis direction) and/or a thickness (e.g., a length in a Z-axis direction) that is small compared to a pattern formed on the M3 layer. Therefore, the power rail PR30a including the conductive line L01a of the M1 layer and the conductive line L02a of the M2 layer may not mitigate an IR drop.

Referring to FIG. 3B, the power rail PR30b according to the comparative example may include a conductive line L01b formed in the M1 layer and extending in the X-axis direction. Conductive lines formed in the M2 layer, which is a layer in which a signal of the standard cell moves, may extend across the power rail PR30b in the Y axis direction. Thus, in the comparative example of FIG. 3B, a degree of freedom of signal routing may be ensured; however, an influence of the IR drop generated in the power rail PR30b may be increased, since power is supplied to standard cells through the single conductive line L01b.

Referring to FIG. 3C, the power rail PR30c according to the comparative example may include conductive lines L01c, L02c, and L03c, which are respectively formed in the M1 layer, the M2 layer, and the M3 layer and extend in parallel with each other in the X axis direction. The power rail PR30c may further include vias for electrically interconnecting the conductive lines L01c, L02c, and L03c to each other. An IR drop of the power rail PR30c of FIG. 3C may be migrated compared to that of the power rails PR30a and PR30b of FIGS. 3A and 3B. However, it is limited to using both the M2 layer and the M3 layer for signal routing. Therefore, signal routing congestion may be increased.

As described above with reference to FIGS. 1, 2A, and 2B, power rails according to exemplary embodiments of the inventive concept may include conductive lines formed in the M1 and M3 layers, and may partially include conductive lines formed in the M2 layer. As will be described below with reference to the drawings, the power rail may remove the conductive lines from the M2 layer in a region adjacent to a standard cell where signal routing is to be used. Furthermore, the power rail may include the conductive lines in the M2 layer in a region adjacent to a standard cell where the IR drop is to be mitigated. Thus, the IR drop in the power rail may be mitigated while ensuring a degree of freedom of signal routing.

Figure 4:
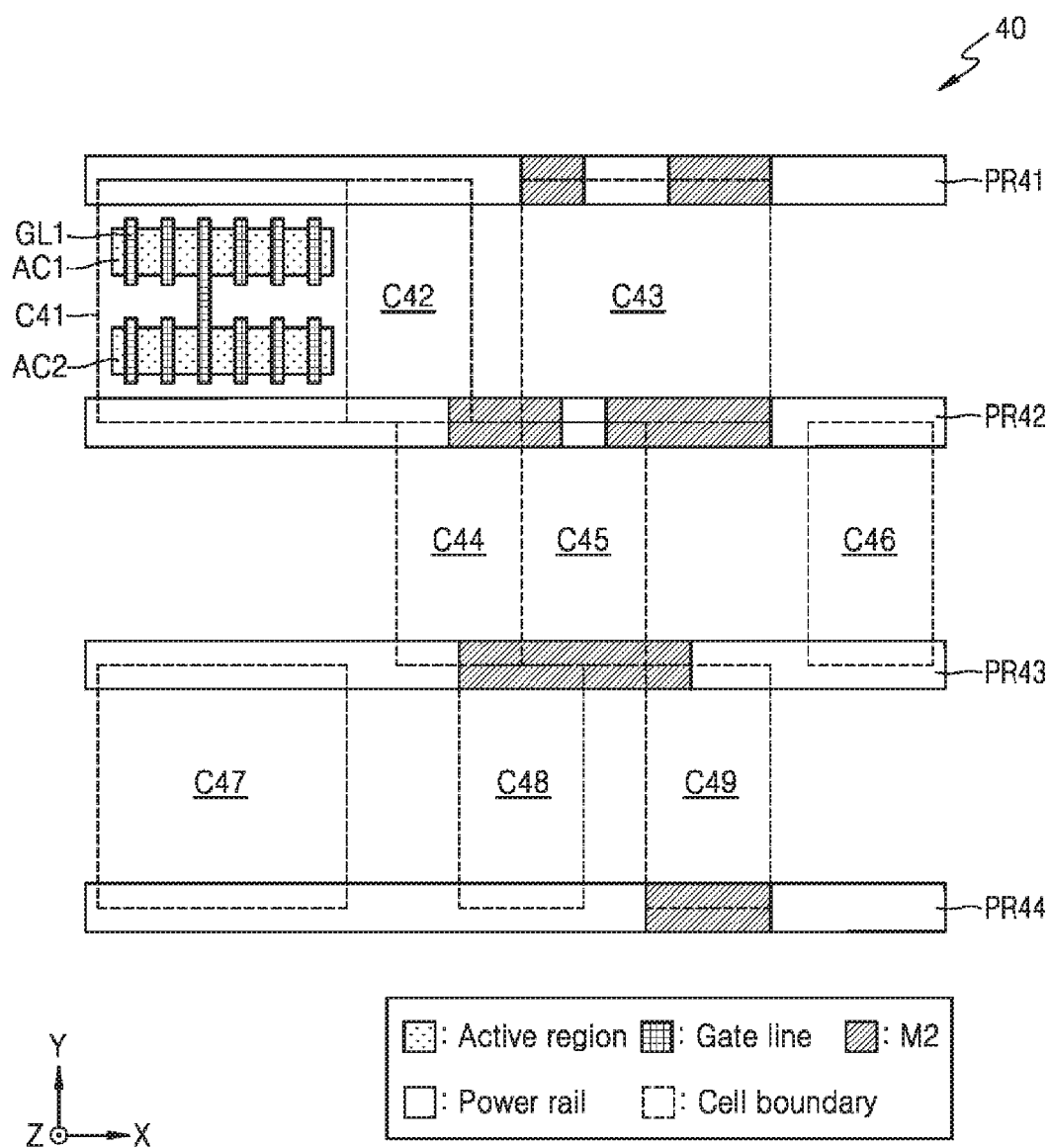
FIG. 4 is a diagram of a part of an integrated circuit according to an exemplary embodiment of the inventive concept.

FIG. 4 is a diagram of a part of an integrated circuit 40 according to an exemplary embodiment of the inventive concept.

Referring to FIG. 4, the integrated circuit 40 may include a plurality of power rails PR41 to PR44 extending in parallel to each other in an X-axis direction and a plurality of standard cells C41 to C49 disposed between the plurality of power rails PR41 to PR44. Each of the plurality of standard cells C41 to C49 may include at least one active region extending in the X-axis direction and at least one gate line extending in a Y-axis direction. For example, as shown in FIG. 4, the standard cell C41 may include active regions AC1 and AC2 extending in the X-axis direction and may include a plurality of gate lines including a gate line GL1 extending in the Y-axis direction. In an exemplary embodiment of the inventive concept, the active regions AC1 and AC2 may include a semiconductor such as Si or Ge, or a compound semiconductor such as SiGe, SiC, GaAs, InAs, or InP, and may include a conductive region, for example, a well doped with impurities and a structure doped with impurities. The gate lines may include a work function metal containing layer and a gap fill metal film. For example, the work function metal containing layer may include at least one metal of Ti, W, Ru, Nb, Mo, Hf Ni, Co, Pt, Yb, Tb, Dy, Er, and Pd, and the gap fill metal film may be a W film or an Al film. In an exemplary embodiment of the inventive concept, the gate lines may include a stack structure of TiAlC/TiN/W, a stack structure of TiN/TaN/TiAlC/TiN/W or a stack structure of TiN/TaN/TiN/TiAlC/TiN/W.

Each of the power rails PR41 to PR44 shown in FIG. 4 may include conductive lines which are respectively formed in the M1 layer and the M3 layer and extend in parallel with each other in the X axis direction. In FIG. 4, the power rails PR41 to PR44 may include a conductive line formed in the M2 layer in a portion where a pattern of the M2 layer is drawn on the power rails PR41 to PR44.

Referring to FIG. 4, in an exemplary embodiment of the inventive concept, the power rails PR41 to PR44 may include the conductive line formed in the M2 layer at a boundary of a standard cell. For example, as shown in FIG. 4, the first and second power rails PR41 and PR42 may each include conductive lines of the M2 layer overlapping a boundary of the standard cell C43. The second and third power rails PR42 and PR43 may each include the conductive lines of the M2 layer overlapping boundaries of the standard cells C44 and C45. Additionally, the third and fourth power rails PR43 and PR44 may each include the conductive lines of the M2 layer overlapping a boundary of the standard cell C49. The third power rail PR43 may include conductive lines of the M2 layer overlapping a boundary of the standard cell C48. Further, the conductive lines of the M2 layer may be continuous in standard cells adjacent to each other in the X-axis direction, such as the standard cells C44 and C45. Regions where the conductive lines of the M2 layer are not arranged in the power rails PR41 to PR44 may be used for signal routing in the standard cells C41 to C49.

As illustrated in FIGS. 4, 5A, 5B, 6A, and 6B, in exemplary embodiments of the inventive concept, standard cells may be classified into first and second groups. The first group has a boundary overlapping with the conductive line formed in the M2 layer of adjacent power rails of the power rails PR41 to PR44 and the second group that does not have a boundary overlapping with the conductive line formed in the M2 layer of adjacent power rails of the power rails PR41 to PR44. For example, in FIG. 4, the standard cells C43, C44, C45, and C49 may belong to the first group having the boundary overlapping with the conductive line formed in the M2 layer in adjacent power rails, while the standard cells C41, C42, C46, C47, and C48 may belong to the second group that does not have the boundary overlapping with the conductive line formed in the M2 layer in adjacent power rails.

Transistors in the standard cells of the first group may be supplied with high magnitude currents, or high magnitude currents may be drawn out from the transistors due to certain performance requirements. The high-current inducing performance requirements may include, for example, a fast rise/fall time of an output signal or a short propagation delay, etc. For example, the standard cells C43, C44, C45, and C49 may include signal buffers, clock buffers, inverters, etc. In other embodiments, the standard cells may be included in a timing critical path of the integrated circuit 40.

The second group may have a structure that promotes signal routing, e.g., the standard cells of the second group may include a large number of input pins and output pins. For example, the standard cells C41, C42, C46, C47, and C48 may include an and-or-invert AO122, etc., which have a larger number of input pins per area than other standard cells. Additionally, the second group may include standard cells that are not included in the timing critical path of the integrated circuit 40.

Figure 5A:
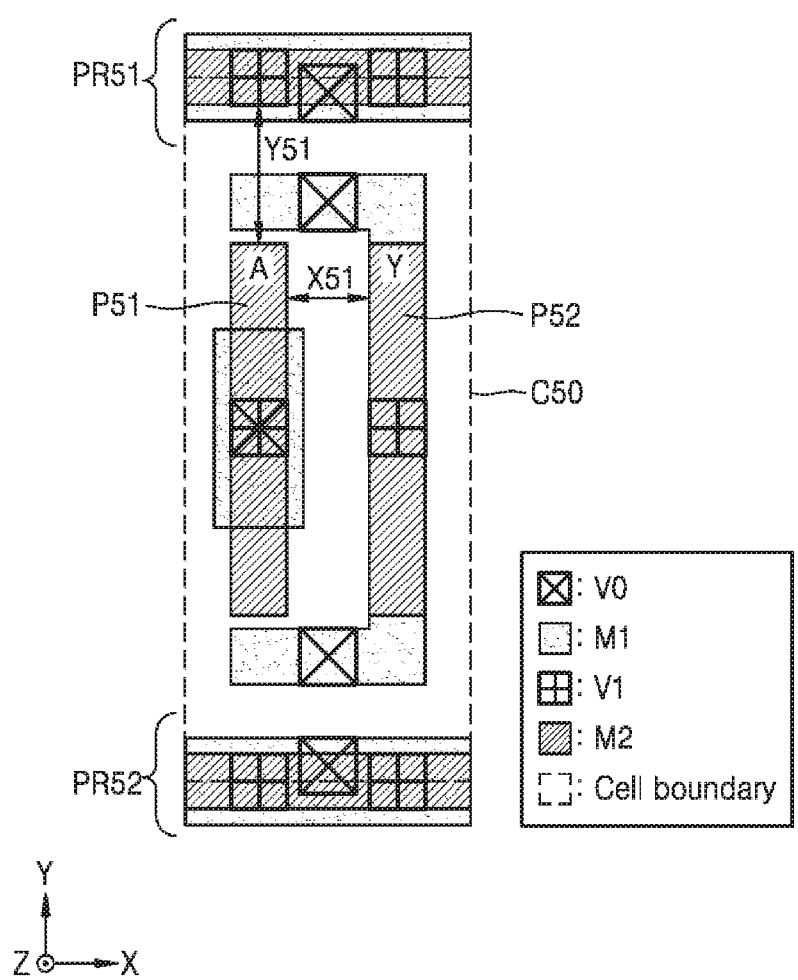
FIGS. 5A and 5B are diagrams showing a standard cell according to an exemplary embodiment of the inventive concept.
Figure 5B:
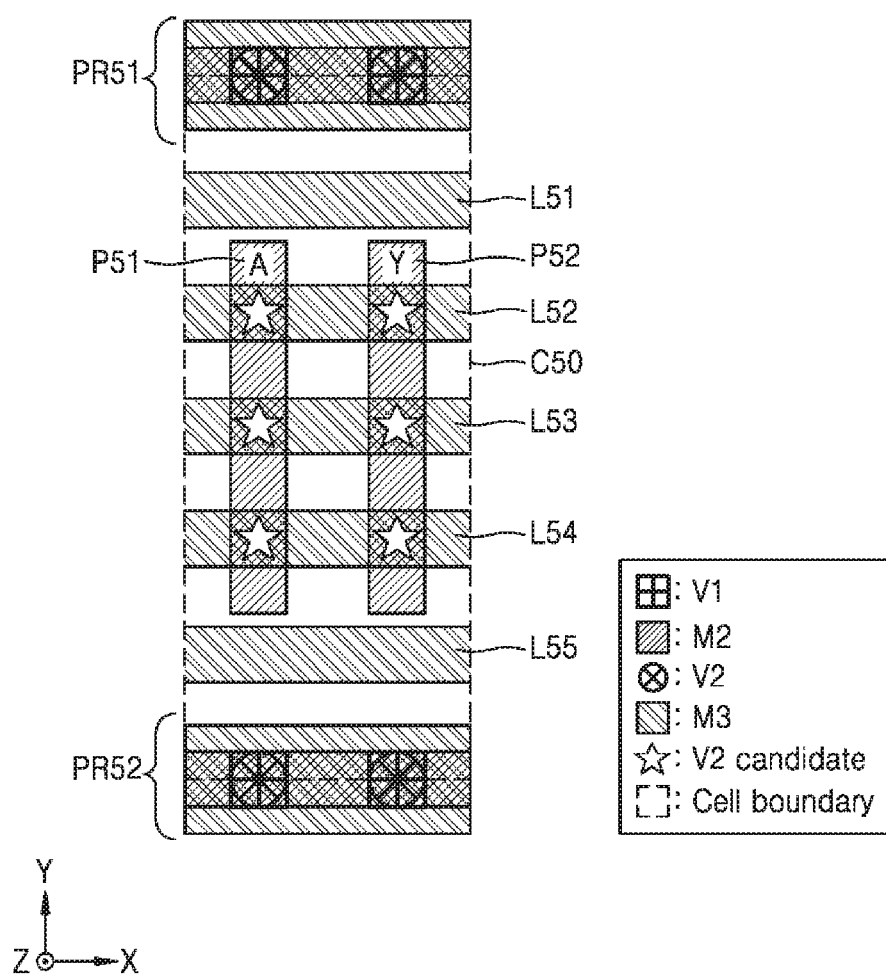

FIGS. 5A and 5B are diagrams showing a standard cell C50 according to an exemplary embodiment of the inventive concept. For example, FIG. 5A illustrates the standard cell C50 and a layout around the standard cell C50. FIG. 5B illustrates some layers of the layout around the standard cell C50. The standard cell C50 may be an inverter.

The standard cell C50, which is the inverter, may be sensitive to an IR drop generated in power rails PR51 and PR52. For example, an output signal of the inverter may have a fast rise/fall time, and thus, regions of the power rails PR51 and PR52 adjacent to the standard cell C50 may be reinforced with conductive lines formed in the M2 layer as shown in FIGS. 5A and 5B. Accordingly, the power rails PR51 and PR52 may include conductive lines formed respectively in the M1 layer, the M2 layer, and the M3 layer which extend in an X axis direction, and include vias for electrically interconnecting the conductive lines.

Referring to FIG. 5A, the standard cell C50 may include an input pin P51 to which an input signal A is applied and which is formed in the M2 layer. The standard cell C50 may also include an output pin P52 from which an output signal Y is output and which is formed in the M2 layer. As shown in FIG. 5A, the input pin P51 and the output pin P52 may be spaced apart from the conductive line of the M2 layer included in the power rail PR51 by a predetermined distance Y51 and may be spaced apart from each other by a predetermined distance X51. The predetermined distances Y51 and X51 may be set depending on a semiconductor processor a design rule. In an exemplary embodiment of the inventive concept, the distance Y51 in the Y-axis direction may be greater than the distance X51 in the X-axis direction.

Referring to FIG. 5B, a plurality of conductive lines L51, L52, L53, L54 and L55 that are formed in the M3 layer and extend in parallel to each other in the X-axis direction may be arranged on the standard cell C50. At least some of the plurality of conductive lines L51 to L55 may be used to route the input signal A and the output signal Y of the standard cell C50. In other words, a via V2 may be placed in at least one of points marked with '☆' in FIG. 5B, and thus, the input pin P51 and/or the output pin P52 may be electrically connected to at least one of the conductive lines L51 to L55 of the M3 layer. Since lengths of the input pin P51 and the output pin P52 in the Y-axis direction are limited due to the conductive line of the M2 layer included in the power rails PR51 and PR52 as described above with reference to FIG. 5A, points at which the via V2 may be placed in the standard cell C50 may be limited. For example, no points marked with '☆' are shown in the conductive lines L51 and L55 of the M3 layer. However, since the power rails PR51 and PR52 may be reinforced by the conductive lines of the M2 layer, the standard cell C50 may provide good performance due to the mitigated IR drop.

Figure 6A:
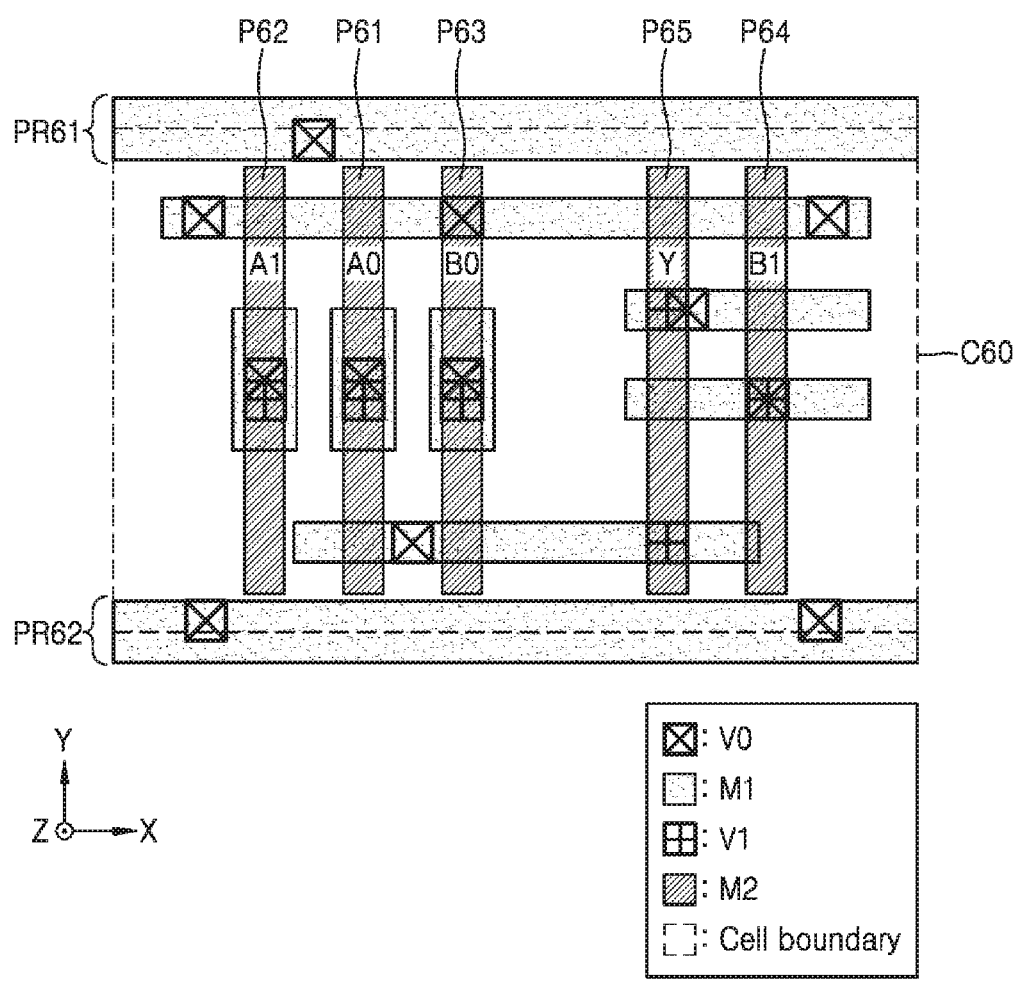
FIGS. 6A and 6B are diagrams illustrating a standard cell according to an exemplary embodiment of the inventive concept.
Figure 6B:
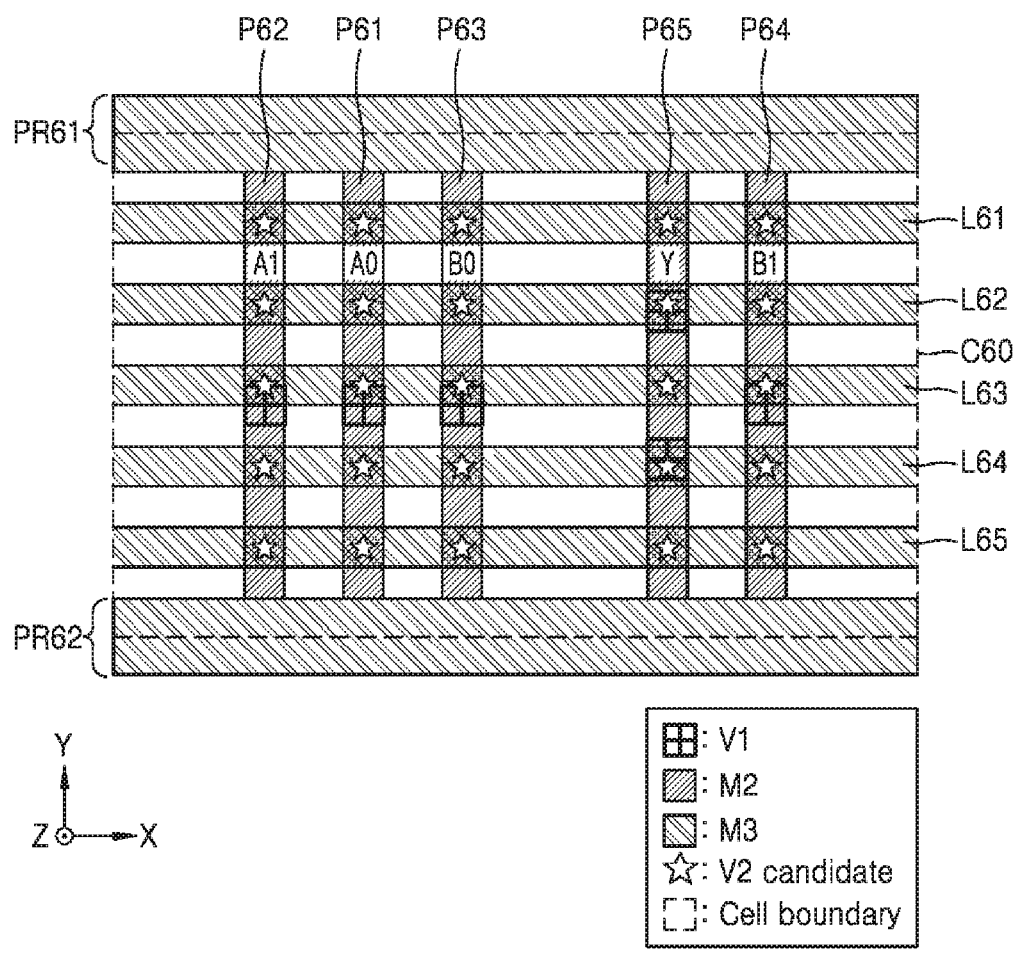

FIGS. 6A and 6B are diagrams illustrating a standard cell C60 according to an exemplary embodiment of the inventive concept. For example, FIG. 6A illustrates the standard cell C60 and a layout around the standard cell C60. FIG. 6B illustrates some layers of the layout around the standard cell C60. The standard cell C60 may be an AOI22.

The standard cell C60 that is AO22 may have a relatively large number of input signals A0, A1, B0, and B1. Thus, as shown in FIGS. 6A and 6B, conductive lines formed in the M2 layer may be omitted in regions of power rails PR61 and PR62 adjacent to the standard cell C60. Accordingly, the power rails PR61 and PR62 may include conductive lines respectively formed in the M1 layer and the M3 layer and extending in an X-axis direction.

Referring to FIG. 6A, the standard cell C60 may include input pins P61, P62, P63 and P64 to which the input signals A0, A1, B0, and B1 are applied and which are formed in the M2 layer and an output pin P65 from which an output signal Y is output and which is formed in the M2 layer. As shown in FIG. 6A, the input pins P61 to P64 and the output pin P65 may extend in a Y-axis direction to a position close to a boundary of the standard cell C60. The close proximity of the pins P61 to P65 to the boundary of the standard cell C60 is due to omission of the conductive line of the M2 layer in the power rails PR61 and PR62.

Referring to FIG. 6B, similar to FIG. 5B, a plurality of conductive lines L61, L62, L63, L64 and L65 which are parts of the M3 layer and extend in parallel to each other in the X-axis direction may be arranged on the standard cell C60. At least some of the plurality of conductive lines L61 to L65 may be used to route the input signals A0, A1, B0, B1 and the output signal Y of the standard cell C60. In other words, the via V2 may be placed in at least one of points marked with '☆' in FIG. 6B, and thus, the input pins P61 to P64 and the output pin P65 may be electrically connected to at least one of the conductive lines L61 to L65 of the M3 layer. Since the input pins P61 to P64 and the output pin P65 extend close to a boundary of the standard cell C60 due to the conductive line of the M2 layer being omitted from the power rails PR61 and PR62 as described above with reference to FIG. 6A, points at which the via V2 may be placed may be expanded. For example, points marked with '☆' are shown in each of the conductive lines L61 to L65. Additionally, in reference to FIGS. 1, 2A, 2B, 6A and 6B, the input pins P61 to P64 and the output pin P65 may extend in the Y-axis direction across the power rails PR61 and PR62, and thus, the input signals A0, A1, B0, B1 and the output signal Y may be routed to the outside of the standard cell C60. Accordingly, routing congestion for the input signals A0, A1, B0, B1 and the output signal Y of the standard cell C60 may not occur.

Figure 7:
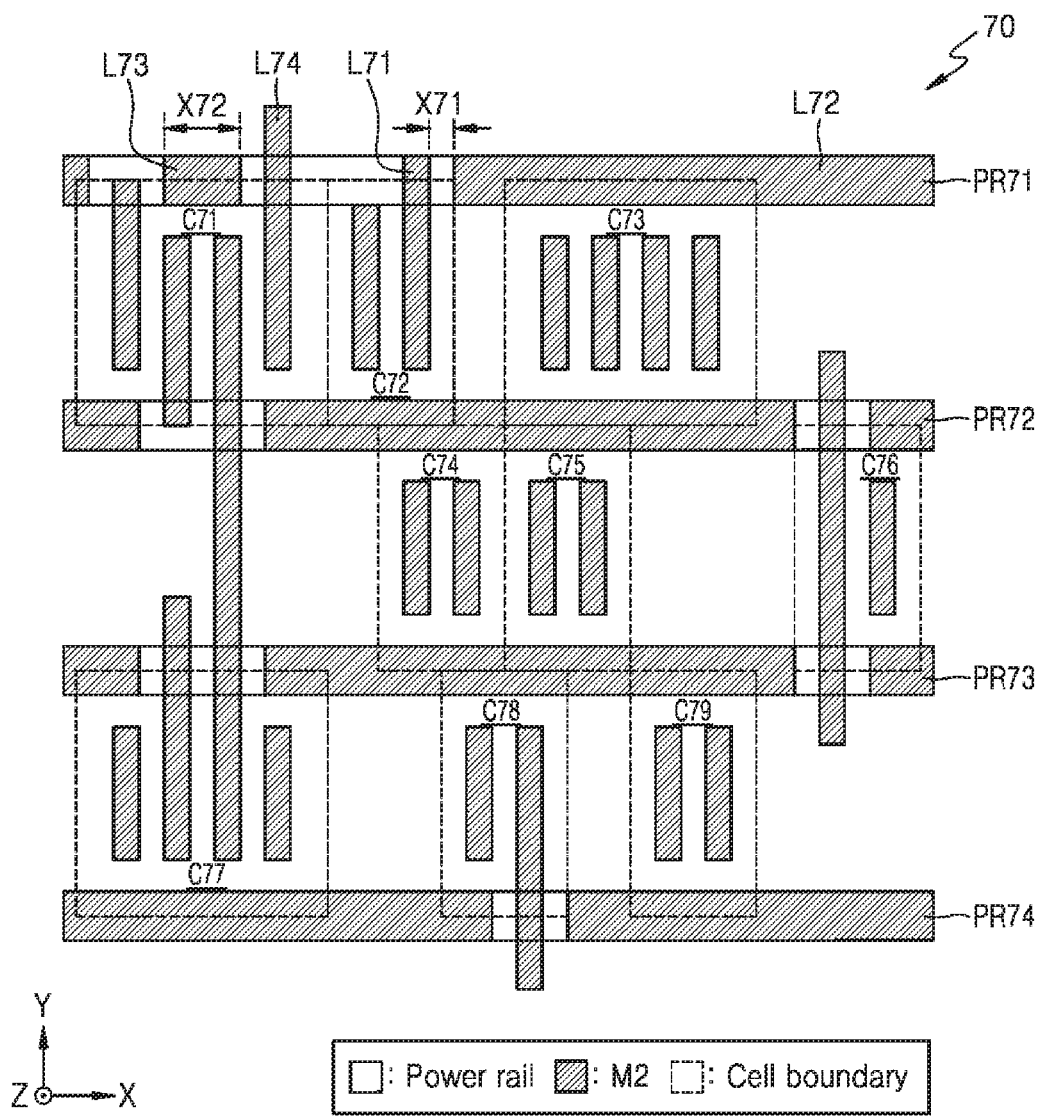
FIG. 7 is a diagram illustrating a part of an integrated circuit according to an exemplary embodiment of the inventive concept.

FIG. 7 is a diagram illustrating a part of an integrated circuit 70 according to an exemplary embodiment of the inventive concept. As shown in FIG. 7, the integrated circuit 70 may include a plurality of power rails PR71 to PR74 extending in parallel to each other in an X-axis direction, and a plurality of standard cells C71 to C79 arranged between the plurality of power rails PR71 to PR74. In reference to FIGS. 1, 2A, and 2B, each of the power rails PR71 to PR74 in FIG. 7 may include conductive lines formed in each of the M1 layer and the M3 layer and extending in parallel to each other in the X-axis direction. Similar to FIG. 4, for convenience, FIG. 7 shows only the M2 layer in the power rails PR71 to PR74.

Referring to FIG. 7, in an exemplary embodiment of the inventive concept, the power rails PR71 to PR74 may include the conductive lines of the M2 layer extending along the X-axis direction to a point spaced apart by a predetermined distance from pattern (or a conductive line) of the M2 layer extending in the Y axis direction in a standard cell. For example, as shown in FIG. 7, the power rail PR71 may include a pattern L71 of the M2 layer extending in the Y axis direction from the standard cell C72 and a conductive line L72 of the M2 layer extending to a point spaced apart from the pattern L71 by a distance X71 in the X axis direction. Thus, as shown in FIG. 7, in regions where patterns of the M2 layer for routing signals of the standard cells C71 to C79 are not formed, the conductive lines formed in the M2 layer of the power rails PR71 to PR74 may be extended. For example, conductive line L72 may be extended in the X-axis direction up to a point where the pattern L71 for signal routing is formed. In other words, since the conductive lines formed in the M2 layer of the power rails PR71 to PR74 may continue to extend after signal routing, the power rails PR71 to PR74 may be reinforced and an IR drop may be mitigated.

In an exemplary embodiment of the inventive concept, the conductive lines formed in the M2 layer of the power rails PR71 to PR74 may have a minimum area. For example, as shown in FIG. 7, the power rail PR71 may include the conductive lines L72 and L73 of the M2 layer. The conductive line L73 may have a length X72 in the X axis direction. Conductive lines of the M2 layer less than the length X72 in the X axis direction may be omitted. In other words, the conductive line formed in the M2 layer of the power rail PR71 between the patterns L71 and L74 may be omitted.

Figure 8A:
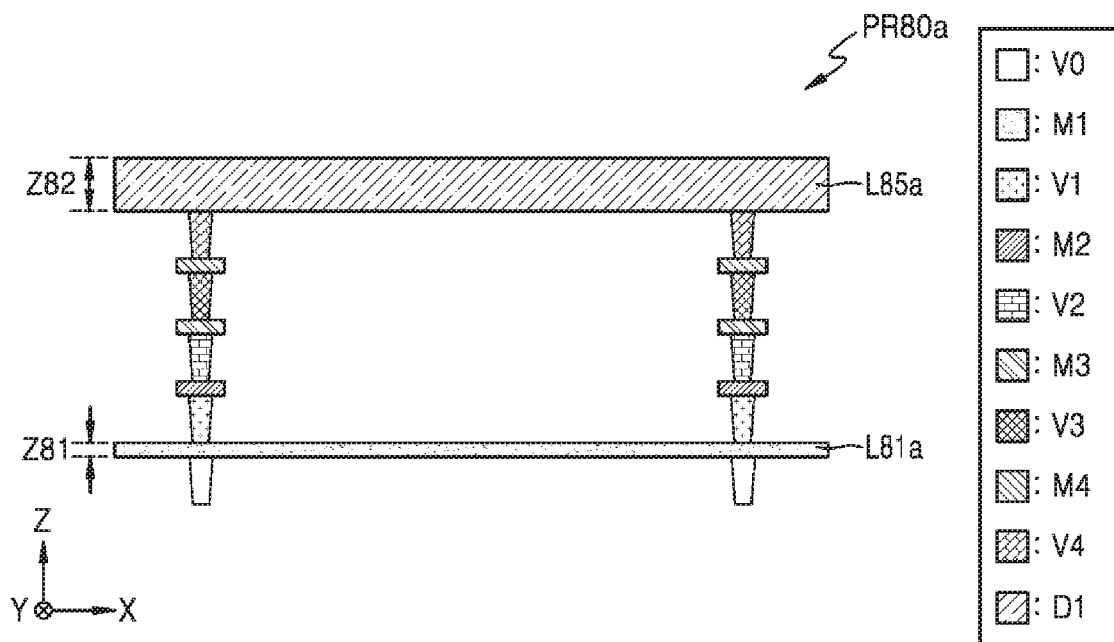
FIGS. 8A, 8B and 8C are diagrams showing power rails according to exemplary embodiments of the inventive concept.
Figure 8B:
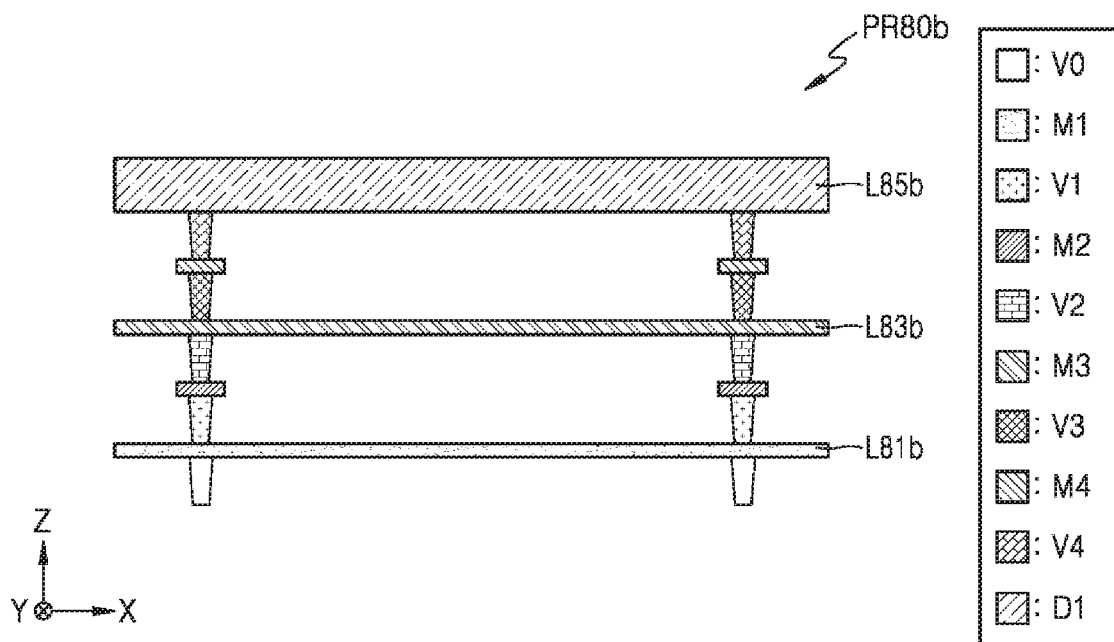
Figure 8C:
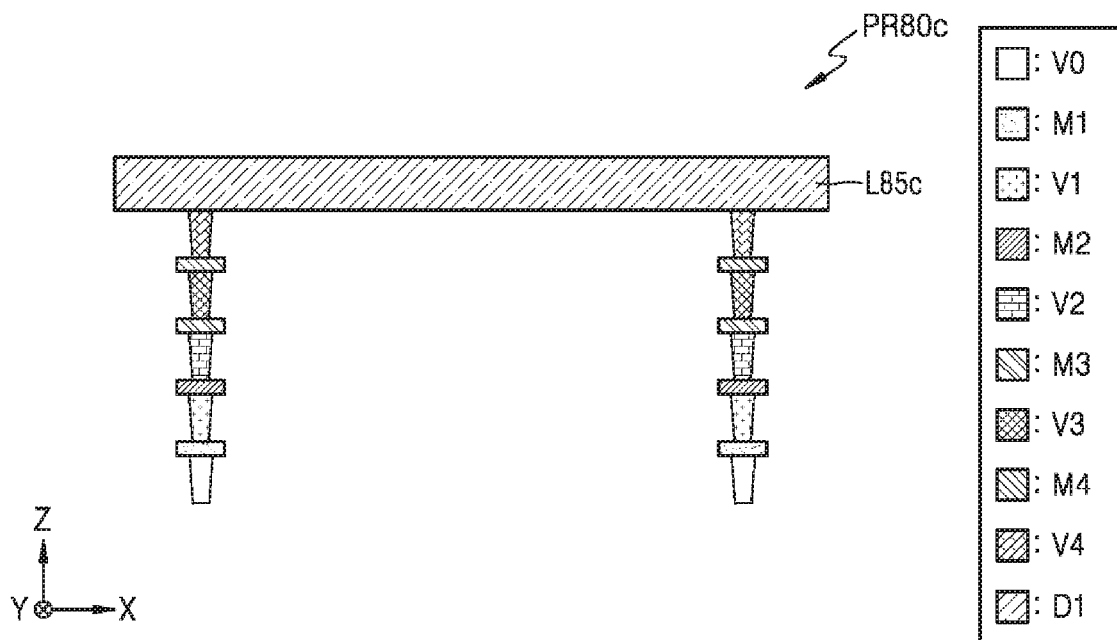

FIGS. 8A, 8B and 8C are diagrams showing power rails PR80a, PR80b, and PR80c according to exemplary embodiments of the inventive concept. As shown in FIGS. 8A to 8C, the power rails PR80a, PR80b and PR80c may include conductive layers adjacent to a semiconductor device (for example, a transistor). For example, in FIGS. 8A to 8C, a conductive line is formed on an upper wiring layer D1 of four layers M1 to M4. Although examples in which the upper wiring layer D1 is located on four layers are shown in FIGS. 8A to 8C, it will be understood that the upper wiring layer D may be located on fewer conductive layers or more conductive layers. For example, the upper wiring layer D1 may be located on a two layer structure.

Referring to FIG. 8A, the power rail PR80a may include a conductive line L81a formed in the M1 layer and extending in the X axis direction, and a conductive line L85a formed in the upper wiring layer D1 and extending in the X axis direction. The conductive lines L81a and L85a may be electrically interconnected through a plurality of vias and patterns of conductive layers. As shown in FIG. 8A, the D1 layer that is the upper wiring layer may have a greater thickness (e.g., a length Z82 in a Z-axis direction) than that (e.g., Z81) of each of the M1-M4 layers and/or may be formed of a material having a high conductivity. Thus, due to a relatively low resistance value of the conductive line L85a, an IR drop of the power rail PR80a may be mitigated. Additionally, the power rail PR80a may enable the M2 layer to the M4 layer to be used for signal routing, and thus, a degree of freedom of signal routing may also be increased.

Referring to FIG. 8B, the power rail PR80b may include conductive lines L81b and L83b respectively formed in the M1 layer and the M3 layer and extending in the X axis direction and a conductive line L85b formed in the D1 layer and extending in the X-axis direction. The conductive lines L81b, L83b, and L85b may be electrically interconnected through a plurality of vias and patterns of conductive layers. The IR drop of the power rail PR80b may be mitigated due to the conductive line L83b formed in the M3 layer as well as the conductive line L85b having a large thickness. Further, the power rail PR80b may use the M2 layer and the M4 layer for signal routing, and thus, a degree of freedom of signal routing may be ensured.

Referring to FIG. 8C, the power rail PR80c may include a conductive line L85c formed in the D1 layer and extending in the X-axis direction. The conductive line L85c may supply power to a lower semiconductor device through a plurality of vias and patterns of conductive layers. The IR drop may be mitigated due to the conductive line L85c having a large thickness, and the power rail PR80c may use the M1, M2, M3 and M4 layers for signal routing. Therefore, a degree of freedom of signal routing may be increased.

Figure 9A:
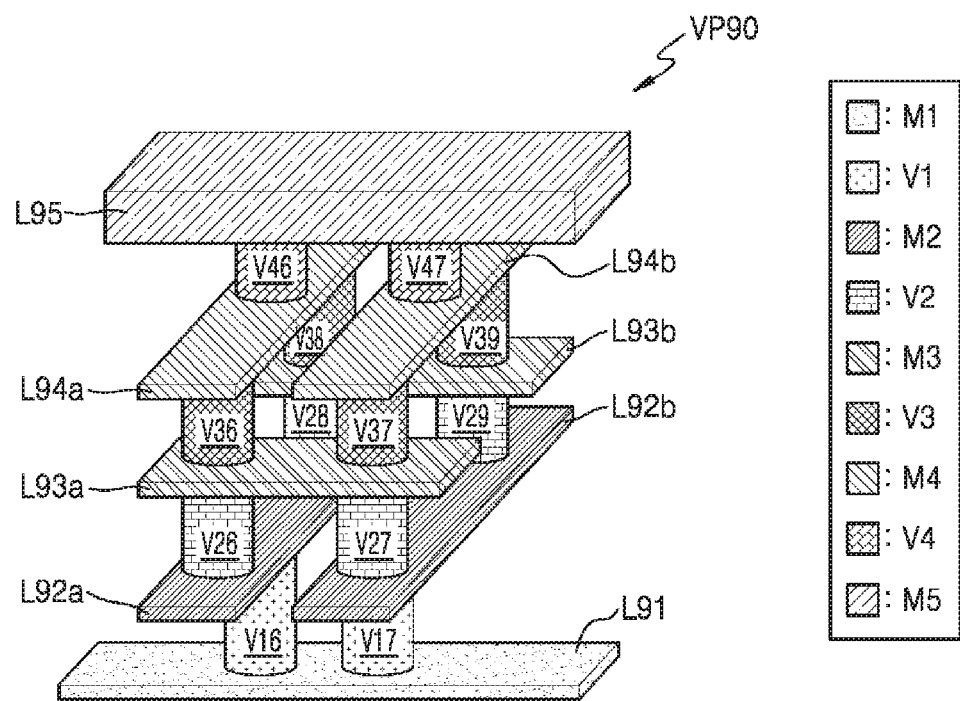
FIGS. 9A, 9B and 9C are diagrams of structures for electrically interconnecting conductive lines of different layers, according to an exemplary embodiment of the inventive concept.
Figure 9B:
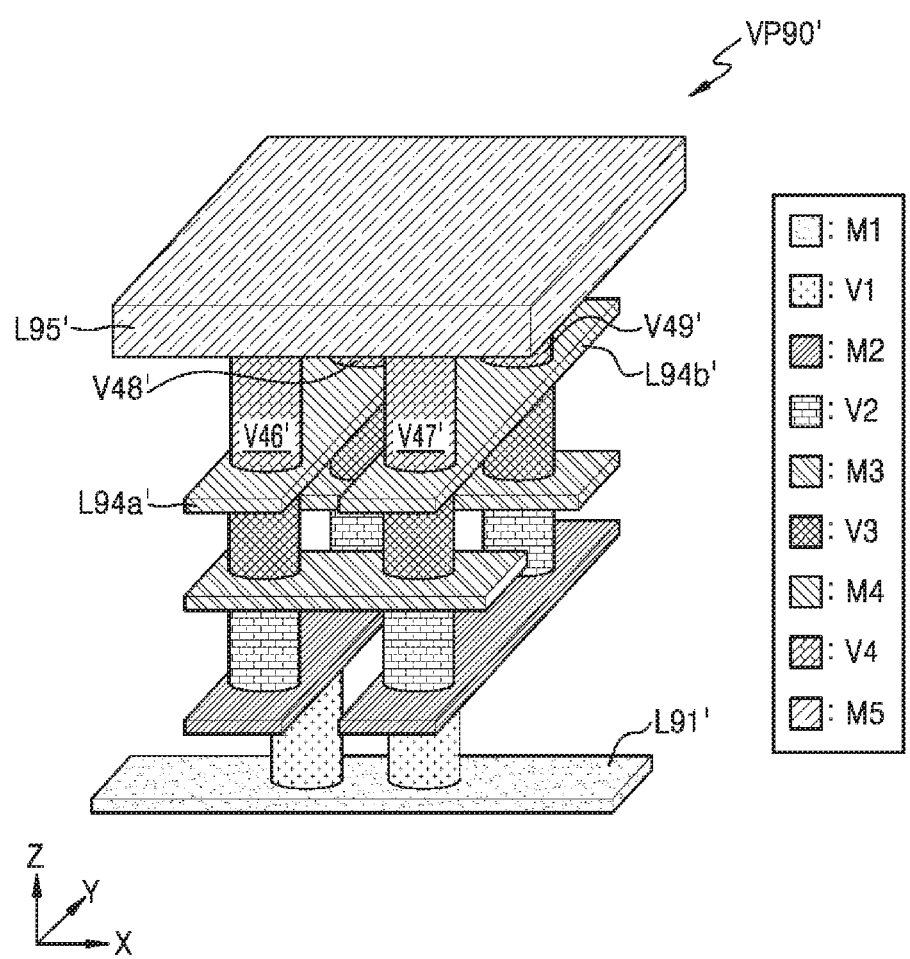
Figure 9C:
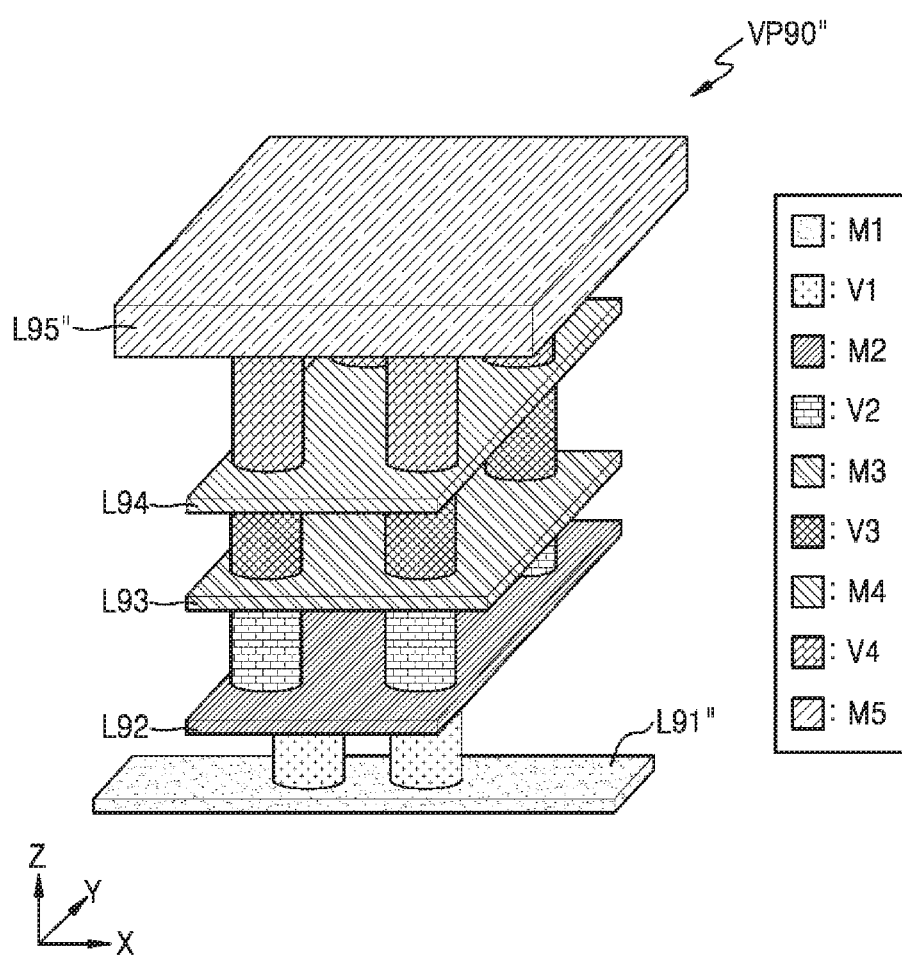

FIGS. 9A, 9B and 9C are diagrams of structures for electrically interconnecting conductive lines of different layers according to an exemplary embodiment of the inventive concept. As shown in FIGS. 9A to 9C, a plurality of vias disposed in parallel to each other on the same layer may be used to reduce resistance between the conductive lines of different layers. This structure may be referred to herein as a via pillar. For example, the exemplary structures shown in FIGS. 9A to 9C may provide a path through which an input signal, an output signal and/or an internal signal moves in a standard cell. The exemplary structures shown in FIGS. 9A to 9C may also be used to connect the conductive lines of power rails extending in different layers. Hereinafter, redundant descriptions of FIGS. 9A to 9C will be omitted.

Referring to FIG. 9A, a via pillar VP90 may include conductive lines L91 and L95 formed in the M1 layer and the M5 layer, respectively, and extending in the X-axis direction. Two vias V16 and V17 may be arranged between the conductive line L91 of the M1 layer and two conductive lines L92a and L92b formed on the M2 layer. The two conductive lines L92a and L92b extending in parallel to each other in the Y axis direction may be disposed on the two vias V16 and V17 to electrically interconnect the conductive lines L91 and L95. Four vias V26, V27, V28 and V29 may be disposed on the two conductive lines L92a and L92b and two conductive lines L93a and L93b formed on the M3 layer and extending in parallel to each other in the X-axis direction may be disposed on the four vias V26 to V29. Four vias V36, V37, V38 and V39 may be disposed on the two conductive lines L93a and L93b and two conductive lines L94a and L94b formed in the M4 layer and extending in parallel to each other in the Y axis direction may be disposed on the four vias V36 to V39. Two vias V46 and V47 may be disposed on two conductive lines L94a and L94b. A conductive line L95 formed on the M5 layer may be disposed on the two vias V46 and V47. By arranging the plurality of vias in the layers as described above, a resistance value between the conductive line L91 of the M1 layer and the conductive line L95 of the M5 layer may be reduced and a semiconductor device that receives power through the conductive line L91 of the M1 layer may have a mitigated IR drop.

Referring to FIG. 9B, similarly to the via pillar VP90 of FIG. 9A, a via pillar VP90' may include conductive lines L91' and L95' formed respectively in the M1 layer and the M5 layer and extending in the X-axis direction. Different from the conductive line L91' formed in the M1 layer, the conductive line L95' of the M5 layer may have a relatively broad width, e.g., a length in the Y-axis direction. Thus, as shown in FIG. 9B, four vias V46', V47', V48' and V49' may be arranged on conductive lines L94a' and L94b' of the M4 layer. The conductive line L91' may be connected to semiconductor devices in a standard cell through a contact and/or a via (e.g., V0) and include patterns for signal routing.

Referring to FIG. 9C, similar to the via pillars VP90 and VP90' of FIGS. 9A and 9B, a via pillar VP90" may include conductive lines L91" and L95" formed respectively in the M1 layer and the M5 layer and extending in the X-axis direction. Different from conductive lines that are respectively formed in the M2 layer to M4 layer and are separated from each other (e.g., to form two lines) in the via pillars VP90 and VP90' of FIGS. 9A and 9B, the conductive lines respectively formed in the M2 layer to the M4 layer in the via pillar VP90" of FIG. 9C may be merged into one solid pattern L92, L93, or L94.

Although the via pillars VP90, VP90', and VP90" include conductive lines formed respectively in the M1 layer and the M5 layer in FIGS. 9A to 9C, it will be understood that the structures shown in FIGS. 9A to 9C may include an additional conductive line. For example, a conductive line may be formed in the M3 layer and extend along the conductive lines of the M1 layer and the M5 layer in the X-axis direction. The via pillars VP90, VP90', and VP90" shown in FIGS. 9A to 9C are examples and the inventive concept is not limited thereto. For example, more than four vias may be arranged in the same layer (e.g., between L93 and L94), a plurality of bar type vias may arranged in the same layer as shown in FIG. 2B, etc.

Figure 10A:
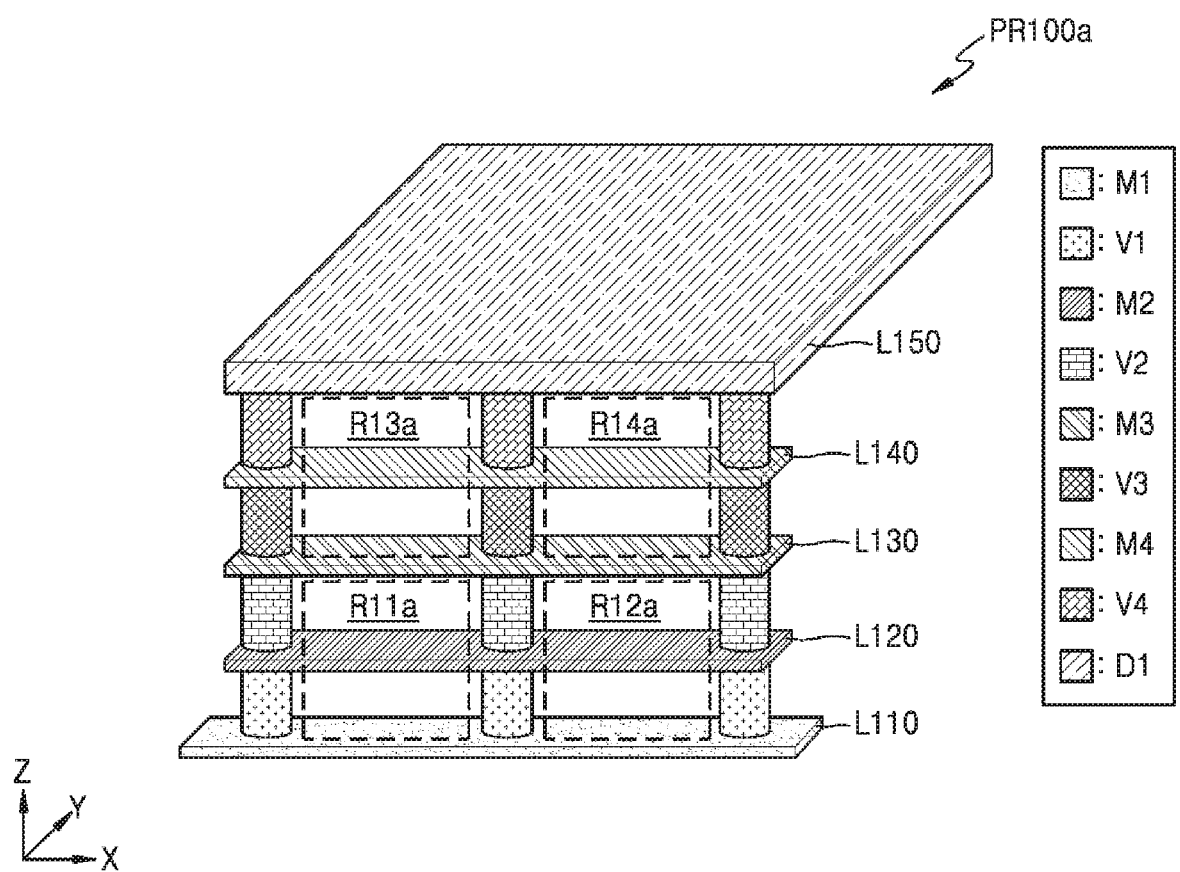
FIGS. 10A and 10B are diagrams showing power rails according to an exemplary embodiment of the inventive concept.
Figure 10B:
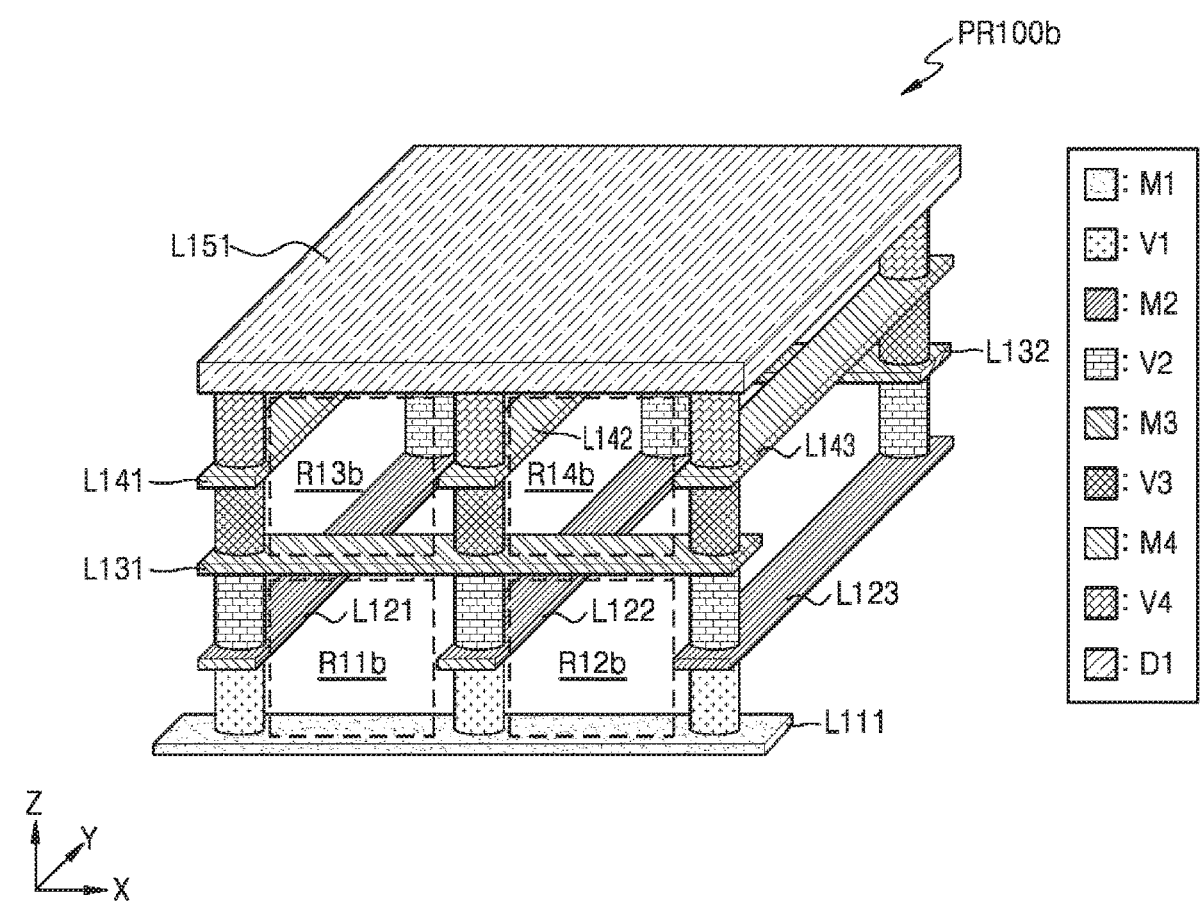

FIGS. 10A and 10B are diagrams showing power rails PR100a and PR100b according to an exemplary embodiment of the inventive concept. As shown in FIGS. 10A and 10B, the power rails PR100a and PR100b may include conductive lines L110, L111, L150 and L151 respectively formed in the M1 layer and the D1 layer and extending in an X axis direction and may include a plurality of vias for electrically interconnecting the conductive lines L110 and L111 of the M1 layer and the conductive lines 150 and 151 of the D1 layer.

Referring to FIG. 10A, the power rail PR100a may include conductive lines L120, L130, and L140 of the M2 layer to the M4 layer connected to a plurality of vias for electrically interconnecting the conductive lines L110 and L150. As shown in FIG. 10A, the conductive lines L120, L130, and L140 may extend in the X-axis direction to enhance an electrical connection between the conductive lines L110 and L150 of the M1 layer and the D1 layer.

Referring to FIG. 10B, the power rail PR100b may include vias spaced in the Y-axis direction in the same layer to electrically interconnect the conductive lines L111 and L151 extending in the X-axis direction, and conductive lines of the M2 layer through the M4 layer connected to the vias and extending in the X or Y axis directions. For example, as shown in FIG. 10B, the conductive lines L121, L122 and L123 of the M2 layer may extend in the Y-axis direction and a plurality of vias spaced apart from each other in the Y-axis direction may be arranged on the conductive lines L121, L122 and L123 of the M2 layer. The conductive lines L131 and L132 of the M3 layer may extend in the X axis direction while the conductive lines L141, L142 and L143 of the M4 layer may extend in the Y-axis direction.

The power rail PR100b of FIG. 10B may have a structure extending in the Y axis direction to electrically connect the conductive lines L111 and L151 of the M1 layer and the D layer, as compared with the power rail PR100a of FIG. 10A, while providing a space for signal routing. In other words, regions R11a, R12a, R13a and R14a shown in FIG. 10A may be limited for use as a pattern for signal routing due to the conductive lines L120 and L140 being formed in the M2 layer and the M4 layer, whereas regions R11b, R12b, R13b and R14b shown in FIG. 10 may be used as patterns for signal routing due to the conductive lines L121 to L123 and L141 to L143 of the M2 layer and the M4 layer being extended in the Y-axis direction. For example, when the conductive lines L121, L122 and L123 extending in the Y-axis direction are arranged at predetermined intervals in the M2 layer in FIG. 10B, the regions R11b and R12b may be formed in the M2 layer and used for signal routing in the Y-axis direction.

The power rail PR100b of FIG. 10B may have a structure extending in the Y axis direction to electrically connect the conductive lines L111 and L151 of the M1 layer and the D1 layer, as compared with the power rail PR100a of FIG. 10A, while providing a space for signal routing. In other words, regions R11a, R12a, R13a and R14a shown in FIG. 10A may be limited for use as a pattern for signal routing due to the conductive lines L120 and L140 being formed in the M2 layer and the M4 layer, whereas regions R11b, R12b, R13b and R14b shown in FIG. 10B may be used as patterns for signal routing due to the conductive lines L121 to L123 and L141 to L143 of the M2 layer and the M4 layer being extended in the Y-axis direction. For example, when the conductive lines L121, L122 and L123, which may be referred to as fourth, fifth and sixth conductive lines respectively, extending in the Y-axis direction are arranged at predetermined intervals in the M2 layer in FIG. 10B, the regions R11b and R12b may be formed in the M2 layer and used for signal routing in the Y-axis direction.

Figure 11:
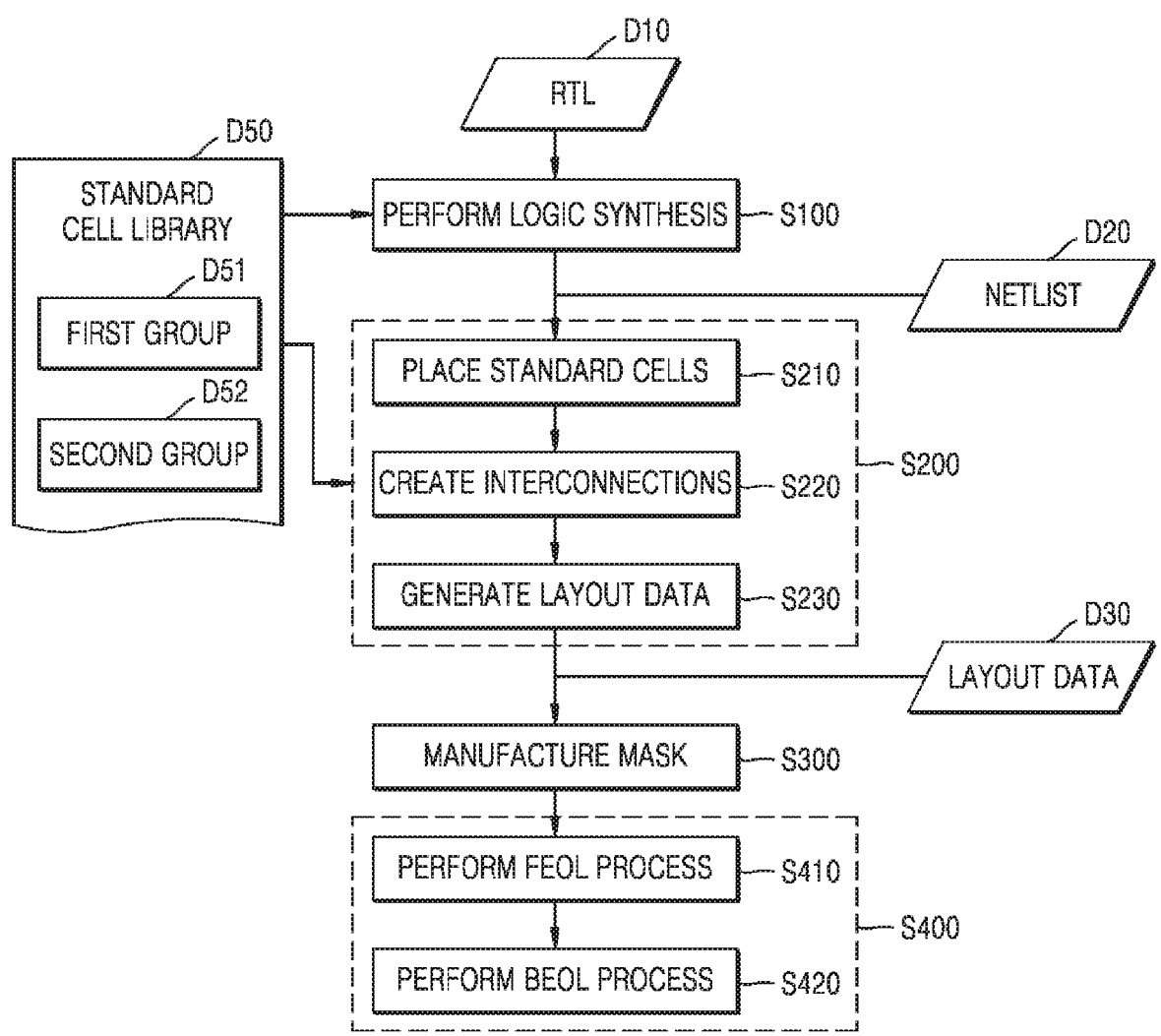
FIG. 11 is a flowchart of a method of fabricating an integrated circuit including a plurality of standard cells, according to an exemplary embodiment of the inventive concept.

FIG. 11 is a flowchart of a method of fabricating an integrated circuit including a plurality of standard cells according to an exemplary embodiment of the inventive concept.

A standard cell library D50 may include information about the plurality of standard cells, for example, function information, characteristic information, layout information, and the like. As shown in FIG. 11, the standard cell library D50 may include first group information D51 and second group information D52. The first group information D51 may include information about standard cells having a boundary overlapping with a conductive line formed in the M2 layer in adjacent power rails, as described above with reference to FIGS. 5A and 5B. The second group information D52 may include information about standard cells that do not have a boundary overlapping with a conductive line formed in the M2 layer in adjacent power rails, as described above with reference to FIGS. 6A and 6B.

Referring to FIG. 11, in operation S100, logic synthesis may be performed to generate netlist data D20 from register transfer level (RTL) data D10. For example, a semiconductor design tool (e.g., a logic synthesis tool) may perform logic synthesis based on the RTL data D10 written in hardware description languages (HDLs), such as very high speed integrated circuit (VHSIC) HDL (VHDL) and Verilog. The semiconductor design tool may refer to the standard cell library D50 during the logic synthesis, thereby generating the netlist data D20 including a bitstream or a netlist. As described above, information (e.g., D51) about standard cells in which an IR drop is mitigated by reinforcing adjacent power rails and information (e.g., D52) about standard cells with an increased degree of freedom for signal routing may be included in the standard cell library D50. Therefore, standard cells with those characteristics may be included in the integrated circuit by using such information in the logic synthesis process.

In operation S200, placement and routing (P&R) operations for generating the layout data D30 from the netlist data D20 may be performed. As shown in FIG. 11, the placement and routing operation S200 may include a plurality of operations S210, S220, and S230.

In operation S210, an operation of placing the standard cells may be performed. For example, a semiconductor design tool (e.g., a P&R tool) may refer to the standard cell library D50 from the netlist data D20 to place a plurality of standard cells. Since the standard cells may have a predetermined height, the semiconductor design tool may place standard cells on intersecting grids with a predetermined length. The power rails may extend in one direction overlapping grids and may be arranged at regular intervals.

In operation S220, operations to generate interconnections may be performed. Interconnections may electrically connect output and input pins of a standard cell and may include, for example, at least one via and at least one conductive pattern. By generating the interconnections, the standard cells may be routed and the M2 layer may be used for routing in some regions of the power rails. Further, as described above with reference to FIG. 7, after signal routing is completed, conductive lines of the M2 layer included in the power rails may extend, and thus, the IR drop in the power rails may be further mitigated.

In operation S230, an operation of generating the layout data D30 may be performed. The layout data D30 may have, for example, a format such as GDSII and may include geometric information of the standard cells and the interconnections.

In operation S300, an operation of manufacturing a mask may be performed. For example, patterns formed in a plurality of layers may be defined according to the layout data D30, and at least one mask (or photomask) for forming the patterns of each of the plurality of layers may be manufactured.

In operation S400, an operation of fabricating the integrated circuit may be performed. For example, the integrated circuit may be fabricated by patterning the plurality of layers using the at least one mask manufactured in operation S300. As shown in FIG. 11, operation S400 may include operations S410 and S420.

In operation S410, a front-end-of-line (FEOL) process may be performed. FEOL may refer to a process of forming individual elements such as transistors, capacitors, resistors, and the like on a substrate during an integrated circuit fabricating process. For example, FEOL may include planarizing and cleaning a wafer, forming a trench, forming a well, forming a gate line, forming a source and a drain, and the like.

In operation S420, a back-end-of-line (BEOL) process may be performed. BEOL may refer to a process of interconnecting individual elements, such as transistors, capacitors, resistors, etc., during the integrated circuit fabrication process. For example, BEOL may include silicidating gate, source and drain regions, adding a dielectric, planarizing, forming holes, adding metal layers, forming vias, forming a passivation layer, and the like. The integrated circuit may then be packaged in a semiconductor package and used as a component in various applications. By the BEOL process (S420), the power rails and patterns for signal routing according to exemplary embodiments of the inventive concept may be formed.

Figure 12:
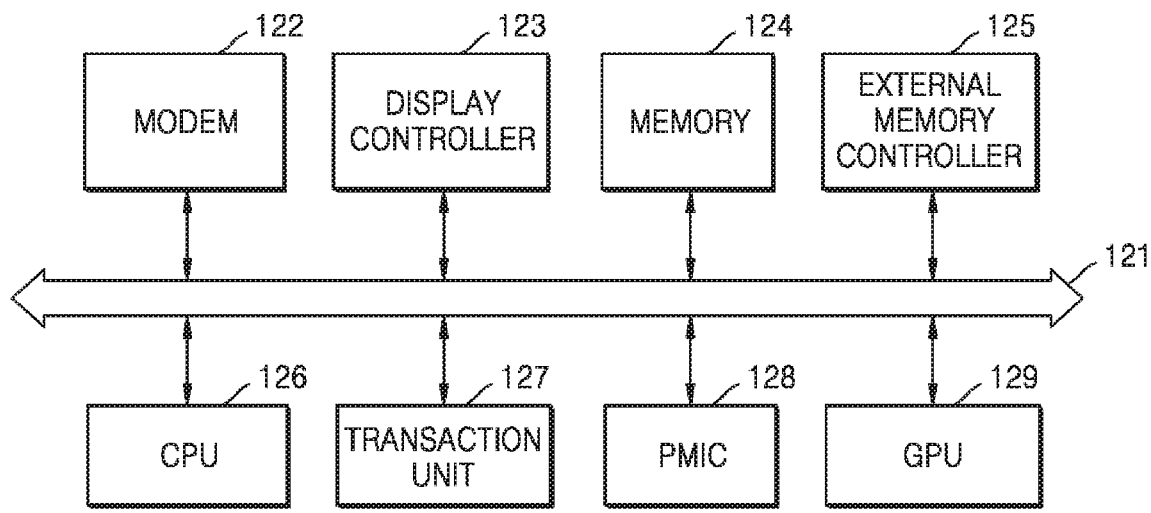
FIG. 12 is a block diagram of a system-on-chip (SoC) according to an exemplary embodiment of the inventive concept.

FIG. 12 is a block diagram of a system-on-chip (SoC) 120 according to an exemplary embodiment of the inventive concept. The SoC 120 may be a semiconductor device and may include an integrated circuit. The SoC 120 is implemented by integrating complex functional blocks, such as intellectual properties (IPs) performing various functions, into a single chip. According to an exemplary embodiment of the inventive concept, a standard cell and a power rail may be included in each of the functional blocks of the SoC 120, and therefore, the SoC 120 may have increased performance due to a mitigated IR drop and efficiently routed patterns.

Referring to FIG. 12, the SoC 120 may include a modem 122, a display controller 123, a memory 124, an external memory controller 125, a central processing unit (CPU) 126, a transaction unit 127, a power management integrated circuit (PMIC) 128, and a graphics processing unit (GPU) 129. The functional blocks of the SoC 120 may communicate with one another through a system bus 121.

The CPU 126, which may control all operations of the SoC 120, may control operations of other functional blocks, for example, the modem 122, the display controller 123, the memory 124, the external memory controller 125, the transaction unit 127, the PMIC 128, and the GPU 129. The modem 122 may demodulate a signal received from outside the SoC 120 or may modulate a signal generated in the SoC 120 and transmit the signal to the outside of the SoC 120. The external memory controller 125 may control operations of transmitting data to and receiving data from an external memory device connected to the SoC 120. For example, programs and/or data stored in the external memory device may be provided to the CPU 126 or the GPU 129 under the control of the external memory controller 125. The GPU 129 may execute program instructions involved in graphics processing. The GPU 129 may receive graphic data through the external memory controller 125 and may transmit processed graphic data to the outside of the SoC 120 through the external memory controller 125. The transaction unit 127 may monitor a data transaction of each functional block. The PMIC 128 may control power supplied to each functional block according to the control of the transaction unit 127. The display controller 123 may control a display (or a display device) outside the SoC 120 and transmit data generated in the SoC 120 to the display.

The memory 124 may be a non-volatile memory, such as electrically erasable programmable read-only memory (EEPROM), flash memory, phase-change random access memory (PRAM), resistance RAM (RRAM), nano floating gate memory (NFGM), polymer RAM (PoRAM), magnetic RAM (MRAM), or ferroelectric RAM (FRAM), or may be a volatile memory, such as dynamic RAM (DRAM), static RAM (SRAM), mobile DRAM, double data rate (DDR) synchronous DRAM (SDRAM), low power DDR (LPDDR) SDRAM, graphics DDR (GDDR) SDRAM, or Rambus DRAM (RDRAM).

Figure 13:
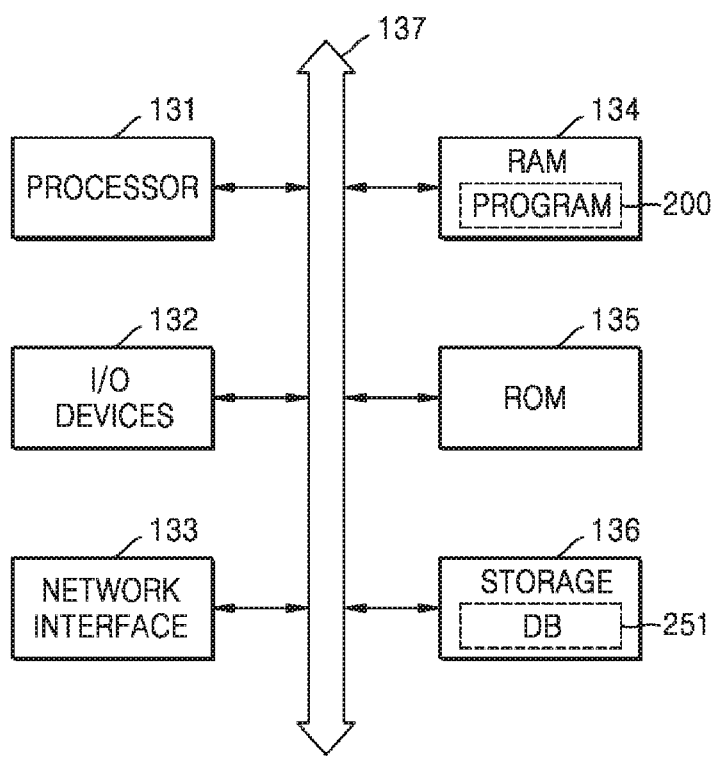
FIG. 13 is a block diagram of a computing system including a memory storing a program, according to an exemplary embodiment of the inventive concept.

FIG. 13 is a block diagram of a computing system 130 including a memory storing a program, according to an exemplary embodiment of the inventive concept. At least some of operations included in a method of fabricating an integrated circuit (e.g., the method shown in FIG. 11) according to an exemplary embodiment of the inventive concept may be performed by the computing system 130.

The computing system 130 may be a stationary computing system such as a desktop computer, a workstation, or a server or may be a portable computing system such as a laptop computer. As shown in FIG. 13, the computing system 130 may include a processor 131, input/output (I/O) devices 132, a network interface 133, RAM 134, ROM 135, and a storage 136. The processor 131, the I/O devices 132, the network interface 133, the RAM 134, the ROM 135, and the storage 136 may be connected to a bus 137 and may communicate with one another through the bus 137.

The processor 131 may be a processing unit and may include at least one core, which may execute an instruction set (e.g., Intel Architecture-32 (IA-32), 64-bit extension IA-32, x86-64, PowerPC, Sparc, microprocessor without interlocked pipeline stage (MIPS), advanced rescued instruction set computer (RISC) machine (ARM), or IA-64), like a microprocessor, an application processor (AP), a digital signal processor (DSP), or a GPU. For example, the processor 131 may access memory, e.g., the RAM 134 or the ROM 135, through the bus 137 and may execute instructions stored in the RAM 134 or the ROM 135.

The RAM 134 may store a program 200 according to an exemplary embodiment of the inventive concept or at least part of the program 200. The program 200 may enable the processor 131 to perform at least some operations included in a method of fabricating an integrated circuit, according to an exemplary embodiment of the inventive concept. In other words, the program 200 may include a plurality of instructions which may be executed by the processor 131. The instructions included in the program 200 may enable the processor 131 to perform, for example, logic synthesis in operation S100 and/or P&R in operation S200 shown in FIG. 11.

The storage 136 may not lose data stored therein even when power supplied to the computing system 130 is cut off. The storage 136 may include a non-volatile memory device or a storage medium such as a magnetic tape, an optical disc, or a magnetic disc. The storage 136 may be removable from the computing system 130. The storage 136 may store the program 200 according to an exemplary embodiment of the inventive concept. Before being executed by the processor 131, the program 200 or at least part of the program 200 may be loaded from the storage 136 to the RAM 134. Alternatively, the storage 136 may store a file written in a program language, and the program 200 generated by a compiler from the file or at least part of the program 200 may be loaded to the RAM 134. The storage 136 may also store a database (DB) 251. The DB 251 may include information, e.g., the standard cell library D50 shown in FIG. 11, used to design an integrated circuit.

The storage 136 may also store data to be processed by the processor 131 or data that has been processed by the processor 131. In other words, the processor 131 may generate data by processing data stored in the storage 136 or may store generated data in the storage 136 according to the program 200. For example, the storage 136 may store the RTL data D10, the net list data D20, and/or the layout data D30.

The I/O devices 132 may include an input device such as a keyboard or a pointing device and an output device such as a display device or a printer. For example, a user may trigger the execution of the program 200 by the processor 131, input the RTL data D10 and/or the net list data D20 shown in FIG. 11, and check the layout data D30 shown in FIG. 11, through the I/O devices 132.

The network interface 133 may provide access to a network outside the computing system 130. For example, the network may include a plurality of computing systems and communication links. The communication links may include wired links, optical links, wireless links, or other types of links.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. An integrated circuit, comprising:
a plurality of standard cells, each comprising at least one active region extending in a first direction, at least one gate line extending in a second direction and at least one pattern formed in a first conductive layer; and
a plurality of power rails extending in the first direction along boundaries of the plurality of standard cells,
wherein a first power rail of the plurality of power rails comprises a first pattern formed in a second conductive layer upper than the first conductive layer and extending in the first direction along a boundary of a first standard cell of the plurality of standard cells, and a length of the first pattern in the first direction is less than a length of the first standard cell in the first direction, wherein the first standard cell comprises a plurality of second patterns formed in the second conductive layer and extending in the second direction, each of the plurality of second patterns has a first width and is spaced apart from an adjacent second pattern by a first distance in the first direction, and the length of the first pattern is greater than a sum of the first width and the first distance, and at least one of the plurality of second patterns is spaced apart from the first pattern in the second direction.

2. The integrated circuit of claim 1, wherein the first power rail further comprises a first conductive line formed in a third conductive layer higher than the second conductive layer and extending in the first direction throughout the first power rail.

3. The integrated circuit of claim 2, wherein the first power rail further comprises:
a second conductive line formed in the first conductive layer lower than the second conductive layer and extending in the first direction throughout the first power rail;
a first via electrically connecting the first pattern and the first conductive line; and
a second via electrically connecting the first pattern and the second conductive line.

4. The integrated circuit of claim 3, wherein at least one of the first via and the second via has a bar type via.

5. The integrated circuit of claim 1, wherein a second power rail of the plurality of power rails is adjacent to the first power rail,
a second standard cell of the plurality of standard cells has a first boundary and a second boundary extending in the first direction and overlapped with the first power rail and the second power rail respectively in a vertical direction orthogonal to the first direction and the second directions, and
the first power rail and the second power rail are configured to provide different supply voltages respectively to the second standard cell.

6. The integrated circuit of claim 5, wherein the first power rail comprises a pattern formed in the second conductive layer and extending in the first direction throughout the first boundary, and
the second power rail comprises a pattern formed in the second conductive layer and extending in the first direction throughout the second boundary.

7. The integrated circuit of claim 5, wherein the second standard cell comprises a second pattern and a third pattern formed in the second conductive layer and extending in the second direction,
the second pattern overlaps with the first power rail in the vertical direction and is insulted from the first power rail, and
the third pattern overlaps with the second power rail in the vertical direction and is insulated from the second power rail, and
the third pattern overlaps with the second power rail in the vertical direction and is insulated from the secodn power rail.

8. The integrated circuit of claim 5, wherein the first power rail comprises a pattern formed in the second conductive layer and extending in the first direction throughout the first boundary, the second standard cell comprises a second pattern formed in the second conductive layer and extending in the second direction, and
the second pattern overlaps with the second power rail in the vertical direction and is insulated from the second power rail.

9. An integrated circuit, comprising:
a first power rail and a second power rail extending in a first direction and configured to provide different supply voltages respectively to a first standard cell;
at least one active region extending in the first direction between the first power rail and the second power rail;
at least one gate line extending in a second direction between the first power rail and the second power rail; and
a first pattern passing in the second direction between a pair of patterns included in the first power rail and configured to transfer an input signal or an output signal of the first standard cell, wherein the pair of patterns is formed in a same layer as the first pattern; and
a second pattern extending in the second direction between the first and second power rails, first and second ends of the second pattern being opposite each other along the second direction, the first end being adjacent to and facing the first power rail in the second direction, the second end being adjacent to and facing the second power rail in the second direction, the first and second ends being separated from and located between the first and second power rails in the second direction, and wherein the first and second ends of the second pattern are disposed in the same layer as the first pattern.

10. The integrated circuit of claim 9, wherein the first power rail further comprises a first conductive line formed in a first conductive layer and a second conductive line formed in a third conductive layer, and
the first pattern is formed in a second conductive layer between the first conductive layer and the third conductive layer.

11. The integrated circuit of claim 10, further comprising:
a third pattern formed in the first conductive layer, extending in the first direction and configured to transfer an input signal or an output signal of the first standard cell,
wherein a width of the second pattern is less than a width of the first conductive line.

12. The integrated circuit of claim 11, wherein the third pattern is connected to a semiconductor device included in the first standard cell through a contact and/or a via.

13. The integrated circuit of claim 10, further comprising:
a third pattern formed in the third conductive layer, extending in the first direction and configured to transfer an input signal or an output signal of the first standard cell,
wherein a width of the second pattern is less than a width of the second conductive line.

14. The integrated circuit of claim 9, wherein the first pattern passes in the second direction between a pair of patterns included in the second power rail.

15. The integrated circuit of claim 9, wherein the pair of patterns include a second pattern extending in the first direction along a boundary of the first standard cell, and
a length of the second pattern in the first direction is less than a length of the first standard cell in the first direction.

16. An integrated circuit, comprising:
a first power rail and a second power rail extending in a first direction and configured to provide different supply voltages respectively to a first standard cell;
at least one active region extending in the first direction between the first power rail and the second power rail;
at least one gate line extending in a second direction between the first power rail and the second power rail;
a first pattern passing in the second direction between a pair of patterns included in the first power rail and configured to transfer an input signal or an output signal of the first standard cell, and
a second pattern extending in the second direction between the first and second power rails, first and second ends of the second pattern being opposite each other along the second direction, the first end being adjacent to and facing the first power rail in the second direction, the second end being adjacent to and facing the second power rail in the second direction, the first and second ends being separated from and located between the first and second power rails in the second direction, the first and second ends of the second pattern being disposed in the same layer as the first pattern,
wherein the first power rail comprises a first conductive line and a second conductive line extending in the first direction and formed in a first conductive layer and a third conductive layer respectively, and
the first pattern and the pair of patterns are formed in a second conductive layer between the first conductive layer and the third conductive layer.

17. The integrated circuit of claim 16, wherein a width of the first pattern is less than a length of the pair of patterns in the second direction.

18. The integrated circuit of claim 16, wherein the pair of patterns include a second pattern extending in the first direction along a boundary of the first standard cell, and
a length of the third pattern in the first direction is less than a length of the first standard cell in the first direction.

* * * * *